United States Patent [19]
Mori et al.

[11] Patent Number: 6,128,274
[45] Date of Patent: Oct. 3, 2000

[54] OPTICAL RECORDING DISK CAPABLE OF SUPPRESSING BIMETALLIC EFFECTS CAUSED BY THERMAL EXPANSION

[75] Inventors: Go Mori, Nara; Michinobu Mieda, Shiki-gun; Naoyasu Iketani; Ippei Suzuki, both of Tenri; Yoshiteru Murakami, Nishinomiya; Akira Takahashi, Nara, all of Japan

[73] Assignee: Sharp Kabushiki Kaisha, Osaka, Japan

[21] Appl. No.: 09/188,581

[22] Filed: Nov. 9, 1998

[30] Foreign Application Priority Data

Nov. 19, 1997 [JP] Japan ..................................... 9-318710

[51] Int. Cl.[7] ........................................................ G11B 7/24
[52] U.S. Cl. ........................ 369/275.5; 369/283; 428/64.4
[58] Field of Search ................................... 369/275.1, 272, 369/275.2, 275.5, 280, 287, 288, 283; 428/64.4, 64.9, 64.5, 64.6; 430/320, 321

[56] References Cited

U.S. PATENT DOCUMENTS

| | | | |
|---|---|---|---|
| 4,782,477 | 11/1988 | Ichihara et al. ....................... | 369/275.5 |
| 4,845,000 | 7/1989 | Takeoka et al. ......................... | 430/14 |
| 5,665,520 | 9/1997 | Yoshioka et al. ................ | 430/270.13 |
| 5,972,461 | 10/1999 | Sandstrom ............................. | 428/64.3 |

FOREIGN PATENT DOCUMENTS

| | | |
|---|---|---|
| 04067332 | 3/1992 | Japan . |
| 04349247 | 12/1992 | Japan . |
| 05303769 | 11/1993 | Japan . |
| 8-321079 | 12/1996 | Japan . |

*Primary Examiner*—Tan Dinh
*Attorney, Agent, or Firm*—Dike, Bronstein, Roberts & Cushman, LLP; David G. Conlin; William J. Daley, Jr.

[57] ABSTRACT

An optical disk of the present invention includes a transparent dielectric film formed on a light incident side of the disk on an opposite side of an optical recording film so as to sandwich the transparent substrate therebetween, for suppressing bimetallic effects caused by a difference in thermal expansion between an optical recording film formed on an optical recording surface and the transparent substrate, whereby changes in tilt against temperature changes can be suppressed. Further, by an optimal selection of a reflectance of the transparent dielectric film, unwanted reflection due to multi-interference can be reduced at the same time.

22 Claims, 8 Drawing Sheets

OPTICAL RECORDING DISK CAPABLE OF SUPPRESSING BIMETALLIC EFFECTS CAUSED BY THERMAL EXPANSION

FIELD OF THE INVENTION

The present invention relates to optical disks for recording thereon or reproducing therefrom information by projecting a laser beam.

BACKGROUND OF THE INVENTION

A variety of optical disks have been used in practical applications for recording thereon and reproducing therefrom information by projecting a laser beam, and there have been ever-increasing demands for higher-density recording.

A high density recording can be realized by reducing a diameter w of a beam spot either by reducing a wavelength λ of a semiconductor laser, or increasing a numerical aperture (NA) of a converging objective lens. However, with the current techniques, it is difficult to reduce the wavelength of the laser beam λ. Therefore, attempts have been made to maximize the NA of the objective lens.

However, by increasing the NA of the objective lens, an aberration resulting from the skew of an optical disk with respect to an optical axis of a light beam and a tilt of the disk increases, which lowers a permissible level with respect to the skew of the disk. This causes the problem that deviation or skipping in tracking servo is likely to occur, which results in degrading of recording and reproducing characteristics.

For a CD (Compact Disk: a substrate thickness (1.2 mm)) as an example of recording/reproducing systems available in the market, the NA of the objective lens is 0.45, and for this case, an allowable level of a skew angle θ with respect to an ideal horizontal plane of the disk which permits the aberration to be suppressed within a predetermined range is around ±0.6 deg. Since the aberration increases at a ratio proportional to the 3rd power of the NA, to obtain still higher NA of the objective lens to meet demands for higher density recording, the allowable level of the skew angle θ becomes too small for practical applications.

However, in such optical disks, in the case of increasing the NA of the objective lens, the allowable level of the skew angle θ can be ensured by reducing the thickness d of the disk substrate. Namely, by reducing the thickness of the substrate, the aberration caused by the skew or the tilt of the disk can be reduced. As a result, the allowable level of the skew angle θ can be ensured, thereby permitting practical applications of the described optical disks.

To meet demands for high density recording, it is desirable to reduce the thickness of the disk substrate to be not more than 1 mm. In recent years, optical disks having a substrate of 0.6 mm thick or 0.8 mm thick have been proposed and already used in practical applications. For example, for DVDs (Digital Video Disks), two disks, each having a thickness of 0.6 mm are laminated to ensure an allowable level of the skew angle θ.

However, in the case of overwriting by magnetic field modulation in the magneto-optical recording system, as it is required to move a magnetic head in the close proximity to a recording medium, a substrate of a single-layer structure is needed. Such single-layer substrate is advantageous also in view of reproducing costs.

In the case of adopting a single-layer substrate, a problem of tilt may arise due to changes in stress of the film or ambient temperature and moisture. In an event of a tilt of the substrate, a tilt angle is formed with respect to a light beam incident on a disk, thereby generating the aberration. For this reason, it is preferable that the substrate have an ideal flat surface by minimizing the tilt.

In order to suppress the described tilt of the substrate, various techniques have been proposed. For example, Japanese Unexamined Patent Publication No. 67332/1992 (Tokukaihei 4-67332) discloses the technique of reducing the tilt resulting from the internal stress of an optical recording film by adjusting a stress of a composite resin film for use in protecting the substrate and a stress of a composite resin film for use in protecting the optical recording film.

Another technique has been proposed by Japanese Unexamined Patent Publication No. 303769/1993 (Tokukaihei 5-303769) wherein an anti-moisture-permearance film is formed on an opposite side of the recording face of the substrate, and a protecting film is formed on the anti-moisture-permearance film. Therefore, the substrate can be prevented from having moisture permearated only through the light incident side, thereby preventing the tilt of the disk.

According to the described arrangement, a tilt of an optical disk including a substrate of a predetermined thickness can be reduced. However, in the case where a rigidity of the substrate is lowered, and a tilt of the substrate is more likely to occur like the above case of adopting the thin disk substrate, sufficient effects of suppressing the tilt of the disk cannot be ensured.

Here, the effects of the thinner structure of the substrate on the rigidity or the tilt will be explained.

The flexural rigidity D of a uniform flat plane such as a disk substrate can be represented by the following formula (1):

$$D = \frac{Ed^3}{12(1-v^2)} \tag{1}$$

E: modulus of longitudinal elasticity of the flat plate (Young's modulus), d: thickness of the flat plate, and v: Poisson's ratio of the flat plate.

As shown in the above formula (1), as the flexural rigidity D is proportional to the third power of the thickness of the substrate, the flexural rigidity suddenly abruptly decreases as the substrate becomes thinner, and thus a warpage of the substrate is more likely to occur.

The recording medium film (hereinafter referred to as an optical recording film) of the optical disk can be fabricated, for example, by vaporization, sputtering, etc. However, the internal stress remains in the film itself by the film forming process, resulting in the tilt of the disk. The described problem becomes obvious for optical disks having small flexural rigidity of the thin structure like the described arrangement. Further, such tilt angle becomes the skew angle when recording and reproducing, and thus an attempt of increasing the allowable level of the tilt angle θ fails as the tilt of the substrate itself becomes high and the tilt angle θ may even exceed the allowable level.

Further, there exists a difference in mechanical physical values between the optical recording film and the disk substrate thus fabricated. Namely, due to the difference in the thermal expansion, a uniform flat plate such as the disk substrate, etc., may be subjected to flexure by the bimetallic effects. In this case, provided that the strain of the optical recording film is equivalent to the strain of the disk substrate at an interface between them, the film thickness $d_f$ of the optical recording film is significantly smaller than the thickness $d_s$ of the substrate, and the radial tilt angle φ of the optical recording film is very small, then the radial tilt angle φ at the radius position r from the center of the disk can be represented by the following formula (2).

$$\phi = 6r\frac{E_f}{E_s} \cdot \frac{(1-\nu_s)d_f}{(1-\nu_f)d_s^2} \cdot (\alpha_s - \alpha_f)\Delta T \qquad (2)$$

E: Modulus of longitudinal elasticity (Young's modulus),

ν: Poisson's ratio, d: Thickness of the optical recording film or the disk substrate, α: Linear thermal expansion coefficient, and ΔT: Changes in temperature.

Here, the subscripts f and s indicate the optical recording film and the disk substrate respectively. For the tilt angle φ, a positive direction is defined to be a direction in which the substrate is extended.

According to the formula (2), in the case of adopting the optical recording film having different coefficient of linear thermal expansion and the modulus of longitudinal elasticity from those of the disk substrate is formed on the disk substrate, bimetallic effects are induced by the difference in the thermal expansion between the two layers proportional to temperature changes, resulting in the tilt of the optical disk.

For optical disks, it is required to have practically operable temperature range between some minus ° C. and +60° C. Therefore, in this example, the temperature range is set between 25° C. and 55° C. (ΔT=30° C.), and an optical disk including a polycarbonate disk substrate with a diameter of 120 mm, and a thickness of 0 6 nm, and an optical recording film made of Fe with a thickness of 200 nm is used. By converting the numerical values for the above conditions into physical values, the radial tilt angle φ has a physical value of 1.6 deg. Provided that the above disk has a completely flat surface with a tilt angle of 0° at 25° C., then, the tilt angle has changed from the initial value against temperature changes of ±30° C. by ±1.6 deg. This result is by far larger outside the operable range between ±0.4 and 0.6 deg as regulated under conventional CDs, DVDs, magneto-optical disks. It is therefore considered that the above disk cannot be used in practically operable temperature range.

The following example will be given through a rewritable magneto-optical disk in reference to FIG. 6 through FIG. 8. FIG. 6 and FIG. 7 show cross-sectional view of the magneto-optical disk. FIG. 8 shows a change in radial tilt angle under normal conditions in response to temperature change. The magneto-optical disk shown in FIG. 6 and FIG. 7 includes a polycarbonate substrate 101 with a diameter of 120 mm and a thickness of 0.6 mm having formed on its recording surface of a magneto-optical recording film 102 with a thickness of around 200 nm and a protective film 103 made of ultraviolet ray setting resin laminated in this order.

In response to an increase in temperature of the magneto-optical disk, the bimetallic effects are induced, and the substrate 101 warps in its extending direction as shown in FIG. 7. This is because a coefficient of expansion of the substrate 101 is larger than a coefficient of expansion of the optical recording film 102. As a result, as shown in FIG. 8, a change in radial tilt on the average of 0.8 deg. is absorbed in response to temperature changes between 25° C. and 55° C.

The problem of changes in tilt against temperature changes or the initial tilt generated by the internal stress when forming become more noticeable as the disk is made thinner to be suited for high density recording. Namely, to attain high density recording, it is necessary to suppress the initial tilt or changes in tilt by some means.

The techniques of suppressing tilt generated by the internal stress of each film and the moisture disclosed by Japanese Unexamined Patent Publication No 67332/1992 (Tokukaihei 4-67332) and Japanese Unexamined Patent Publication No. 303769/1993 (Tokukaihei 5-303769) are known. However, the techniques disclosed by these publications are not be applied to disk substrates of thin structure in which the flexibility against warpage is low and the bimetallic effects cannot be ignored.

Japanese Unexamined Patent Publication No. 67332/1992 (Tokukaihei 4-67332) which adopts a composite resin film as the stress adjusting means is not suited for reducing a large tilt angle, and fails to provide a solution to suppress a large tilt angle. Namely, Japanese Unexamined Patent Publication No 67332/1992 fails to provide a solution to improve changes in radial tilt against temperature changes which becomes noticeable for the substrates of thin structure.

Japanese Unexamined Patent Publication No. 303769/1993 (Tokukaihei 5-303769) adopts the anti-moisture-permearance film of a thin structure. Therefore, it fails to provide a solution to the described problems. Namely, this publication fails to provide a solution of suppressing changes in radial tilt against temperature changes.

SUMMARY OF THE INVENTION

An object of the present invention is to provide an optical disk having a disk substrate of a thin structure which can realize a high density recording without a tilt of the disk by bimetallic effects.

In order to achieve the above object, an optical disk of the present invention is characterized by including a transparent substrate; an optical recording film formed on one surface of the transparent substrate; and a transparent dielectric film for suppressing bimetallic effects due to a difference in thermal expansion between the optical recording film and the transparent substrate, the transparent dielectric film being formed on an opposite side of the optical recording film so as to sandwich the transparent substrate therebetween.

The described arrangement suppresses a tilt caused by the bimetallic effects due to a difference in thermal expansion between the optical recording film and the substrate which is noticeable particularly for a thin film substrate suited for high density recording by forming the transparent dielectric film on an opposite side (light incident side of the substrate) of the optical recording film so as to sandwich the substrate therebetween.

According to the described arrangement, with optimal selections for the physical values of the transparent dielectric film, the bimetallic effects caused by a difference in thermal expansion between the optical recording film and the substrate can be suppressed by the transparent dielectric film formed on the opposite side. As a result, an entire stress of the optical recording film is substantially balanced with an entire stress of the transparent dielectric film in the fabrication process, thereby achieving improved initial tilt characteristics as well.

It may be arranged such that the transparent dielectric film is made of a material selected from the group consisting of AlN, SiN and AlSiN, and has a thickness d (nm) satisfying the following formula, 0.1x<d<x, wherein x is a film thickness (nm) of the optical recording film.

According to the described arrangement, in the case of adopting the transparent dielectric film made of AlN, SiN or AlSiN, by setting the film thickness d (nm) of the transparent dielectric film so as to satisfy the condition of 0.1x<d<x, the tilt characteristics of the optical disk can be improved in a desirable state.

The optical disk of the present invention may be also arranged such that the transparent dielectric film is made of AlN, and has a thickness d (nm) satisfying the following formula, 0.1x<d<x, wherein x is a film thickness (nm) of the optical recording film, and the transparent dielectric film has a reflectance of not more than 1.90.

According to the described arrangement, in the case of adopting the transparent dielectric film made of AlN, by reducing the reflectance of the transparent dielectric film to be not more than 1.90 by controlling the fabrication processes, the reflectance of the transparent dielectric film can be set close to the reflectance of the transparent substrate, and the energy reflectance on the light incident side of the transparent substrate can be reduced, whereby an improved utilization efficiency of light and improved signal characteristics can be achieved.

It may be arranged such that the transparent dielectric film has a reflectance n which is larger than a reflectance of the transparent substrate and which is around an integer multiple of $\gamma/2d$, wherein $\gamma$ is a wavelength (nm) of a light beam to be projected on the optical disk, and d is a film thickness of the transparent dielectric film.

According to the described arrangement, by forming the transparent dielectric film on the light incident side to improve tilt characteristics, an amount of reflected light before the light beam reaches the optical recording film increases, and problems arise not only in that the utilization efficiency of light is lowered but also in that a noise signal is contained.

In contrast, according to the described arrangement, in the case where the reflectance n of the transparent dielectric film is larger than the reflectance of the substrate, by selecting the reflectance n to be an integer multiple of $\gamma/2d$ by controlling the fabrication conditions, an amount of reflected light on the light incident side of the substrate can be reduced, whereby an improved utilization efficiency of light and improved signal characteristics can be achieved.

The optical disk of the present invention may be also arranged such that the reflectance n of the transparent dielectric film is smaller than the reflectance of the substrate and is an odd multiple of $\gamma/4d$, wherein d is a film thickness (nm) of the transparent dielectric film, and $\gamma$ is a wavelength (nm) of the light beam.

According to the described arrangement, the problem of lowering the utilization efficiency of light from the conventional level by forming the transparent dielectric film can be solved. Namely, by selecting the reflectance n of the transparent dielectric film to be smaller than the reflectance of the substrate and to be around an odd multiple of $\gamma/4d$ by controlling the fabrication conditions, the amount of light reflected on the light incident side of the substrate can be reduced, whereby an improved utilization efficiency of light and improved signal characteristics can be achieved.

The optical disk of the present invention may be arranged so as to include an anti-reflection coating of at least single-layer structure which is formed adjacent to the light incident surface of the transparent dielectric film so as to have different reflectance from the transparent dielectric film, wherein $n_1$ is smaller than the reflectance of the substrate, and the reflectance is around an odd multiple of $\gamma/4d_1$ wherein $n_1$ is the reflectance of the layer formed in the closest proximity to the light incident side, $d_1$ is the film thickness (nm) of the anti-reflection coating, and the wavelength (nm) of the light beam to be projected on the optical disk is $\gamma$.

According to the described arrangement, in order to overcome the problem that the utilization efficiency of light is lowered from the conventional level by forming the transparent dielectric film, the anti-reflection coating of a single-layer structure is provided, and the layer in the closest proximity to the light incident side of the anti-reflection coating is arranged so as to satisfy the described optical conditions.

As a result, the material of the transparent dielectric film for improving the tilt characteristics and the optimal film thickness can be set as desired. Additionally, the energy reflectance on the light incident side of the substrate can be reduced, and improved energy transmittance can be achieved. As a result, improved utilization efficiency of light and improved signal characteristics can be achieved.

As a result, both tilt characteristics and the optical characteristics can be improved from the conventional level.

The transparent dielectric film of the present invention is made of a compound selected from the group consisting of AlN, SiN, SlSiN, AlTaN, TaO, SiO, $SiO_2$, $TiO_2$, ZnS, $Al_2O_3$, SiAlOH, and $MgF_2$.

Additionally, by forming the transparent dielectric film from one material selected from the group consisting of AlN, SiN, AlSiN, AlTaN, TaO, SiO, $SiO_2$, $TiO_2$, ZnS, $Al_2O_3$, SiAlOH and $MgF_2$, a sufficient transparency as well as an improved initial tilt and changes in tilt against temperature changes can be achieved.

Additional objects, features, and strengths of the present invention will be made clear by the description below. Further, the advantages of the present invention will be evident from the following explanation in reference to the drawings.

DETAILED DESCRIPTION OF THE PREFERRED EMBODIMENTS

[First Embodiment]

Figure 1:
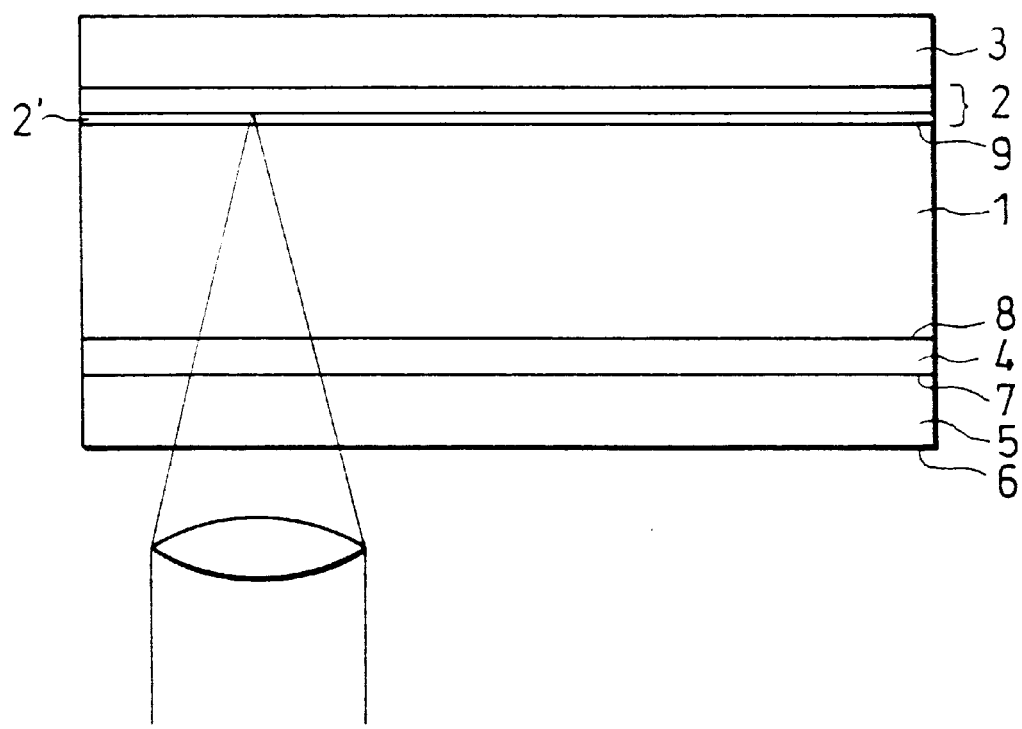
FIG. 1 is a cross-sectional view schematically showing a structure of an optical disk in accordance with the first through fourth embodiments of the present invention.
Figure 2:
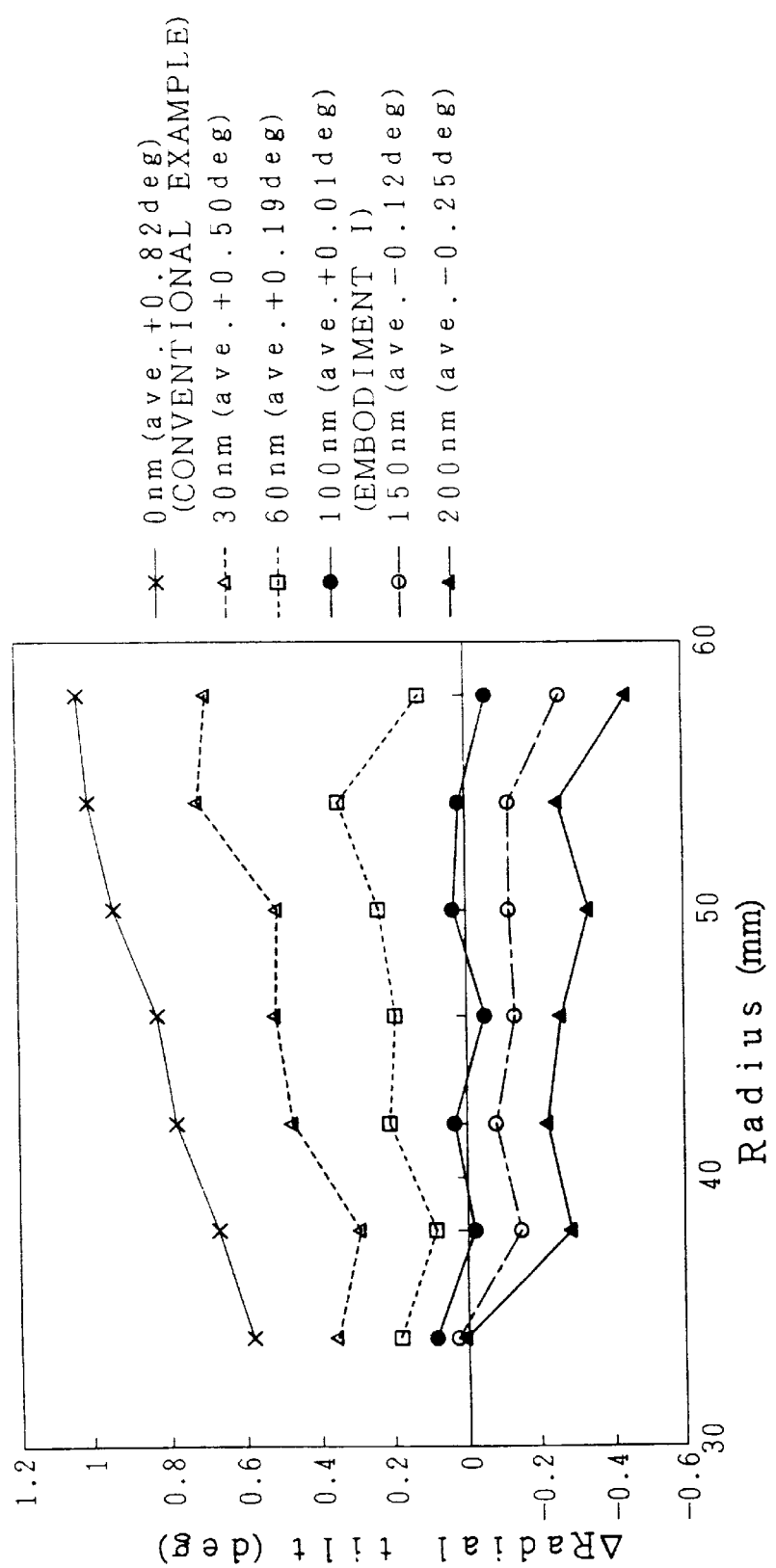
FIG. 2 is a graph showing a change in tilt of the optical disk in accordance with the first embodiment.

The following descriptions will explain one embodiment of the present invention in reference to FIG. 1 and FIG. 2.

As shown in FIG. 1, an optical disk in accordance with the present embodiment includes an optical recording film 2 formed on a recording surface of a disk substrate 1 (hereinafter referred to as a substrate) and a first protective film 3 (protective film) made of an ultraviolet ray setting resin for coating the surface of the optical recording film 2, a transparent dielectric film 4 formed on the light incident side of the substrate 1 and a second protective film 5 (protective film) like the first protective film 3, for coating the surface of the transparent dielectric film 4.

The optical disk of the present invention is not particularly limited, and the present invention is applicable to known optical disks including Magneto-Optical Disks, Compact Disks (CD), Digital Video Disks, Write Once Type Optical Disks, Photochromic Disks, Phase Change Type Disks or the like. Depending on the type of the optical disk to which the present invention is applied, the film structure and the film thickness of the optical recording film 2 differ.

The typical thickness for the conventional substrates is 1.2 mm. In the present invention, however, the substrate 1 having the thickness of 0.6 mm, which is the thickness of the practically used substrate for DVDs, and a diameter of 120 mm is adopted to meet the demands for high density recording. For the material of the substrate 1, for example, plastics which is transparent and is less likely to be deformed against temperature changes can be used. Typically, a polycarbonate substrate may be used. Other than polycarbonate, an acrylic resin, epoxy resin, etc., may be adopted for the substrate 1. In the present embodiment, a polycarbonate substrate 1 having a thickness of 0.6 mm and a diameter of 120 mm may be used.

The optical recording film 2 includes a magneto-optical recording film having a total thickness in a range between 150 and 300 nm. Specifically, the optical recording film 2 has a multilayer structure of a transparent dielectric layer 2', an amorphous magnetic layer of an alloy of a rare-earth metal and a transition metal, a non-magnetic metal layer, a reflective metal layer, etc. In the present embodiment, the optical recording film 2 prepared by sputtering so as to have a total thickness of 200 nm is adopted.

The first protective film 3 and the second protective film 5 are made of, for example, ultraviolet ray setting resin. The first protective film 3 is provided for protecting the optical recording film 2, and the second protective film 5 is provided for protecting the transparent dielectric film 4. For the ultraviolet ray setting resin, for example, acrylic urethane ultraviolet ray setting resin, etc., may be used. Considering that a light beam passes through the second protective film 5 when recording or reproducing signals, a resin which shows excellent transparency to light is needed to improve a utilization efficiency of light.

The thickness of these protective films is typically in the range between 2 and 20 $\mu$m. It is desirable that the first protective film 3 and the second protective film 5 have the same thickness to eliminate the tilt due to the absorption and releasing of moisture by the films 3 and 5 on both surfaces of the substrate 1. In the present embodiment, using the polyurethane acrylate ultraviolet ray setting resin, both the first protective film 3 and the second protective film 5 are prepared so as to have the thickness of around 10 $\mu$m. It may be arranged so as to form a lubricant film or an antistatic coating on the first protective film 3.

The lubricant film may be made of fluorocarbon resin, oil resin, etc., which shows excellent lubricity. By forming the lubricant film on the surface having formed thereon the recording film, when adopting a floating type magnetic head, improved lubricity between the floating type magnetic head and the magneto-optical disk can be achieved. An improved lubricity can be achieved also when adopting a sliding type magnetic head, as a friction between the magnetic head and the magneto-optical disk can be reduced. The lubricant film has an average thickness of around 2 $\mu$m.

The antistatic coating is made of a composition of a resin mixed with an electrically conductive filler. The antistatic coating is provided for preventing the problem which may arise when adopting the floating type magnetic head, by preventing the surface of the optical disk from having dusts adhered thereto and also from being damaged by crust. For such antistatic coating, it is preferable to adopt a hard film having relatively low surface resistance. Specifically, it is preferable that the antistatic coating has a hardness of not less than that of generally used HB pencil, and it is also preferable that the surface resistance be not more than around $10^{13}\Omega$.

The antistatic coating may be prepared by kneading a composite resin or its raw material and a transparent electrically conductive filler at a predetermined mixed ratio to be formed on the substrate. For the above composite resin, for example, acrylic urethane UV setting resin, acrylic UV setting resin, etc., may be adopted. The antistatic coating may be applied on the substrate by a spin coat method, a roll coat method, a dip coat method, etc. The resulting composite resin applied onto the substrate may be hardened by the UV ray projection, heat or cooling treatment depending on the composite resin. The antistatic coating generally has a thickness in a range between 1 and 20 $\mu$m.

For the transparent electrically conductive filler, tin oxide doped with phosphorus is preferable as it satisfies both transparency and stability. The phosphorus may be doped to the tin oxide by a co-precipitation baking method from a liquid phase. For the phosphorus, for example, phosphorus oxide, sodium phosphorus oxide, etc., may be adopted. It is preferable that the phosphorus be doped to the tin oxide in a range of between 3 and 7 wt of the total amount. It is preferable that the content of the electrically conductive filler in the antistatic coating be in a range between 25 and 45 wt %. It is preferable that an average particle diameter of the electrically conductive filler be not more than 0.15 $\mu$m.

Although not shown in the figures, in the present embodiment, it is assumed that an antistatic coating is applied onto the surface of the first protective film 3 to a thickness of around 4 $\mu$m for all optical disks.

The transparent dielectric film 4 is not particularly specified as long as the transparency of the wavelength range of the light beam to be projected onto the optical disk can be ensured. Examples of such material for the transparent dielectric film 4 include inorganic materials such as AlN, SiN, SlSiN, AlTaN, TaO, SiO, $SiO_2$, $TiO_2$, ZnS, $Al_2O_3$, SiAlOH, and $MgF_2$. Among the above-listed inorganic materials, AlN, SiN, SlSiN, AlTaN, TaO, SiO, $SiO_2$, $TiO_2$, $MgF_2$ are especially preferable. The film thickness of the transparent dielectric film 4 differs depending on the materials.

In the present embodiment, five optical disks having different thicknesses (30 nm, 60 nm, 100 nm, 150 nm, and 200 nm) of the AlN film (transparent dielectric film 4) are prepared for the purpose of cancelling out the bimetallic effects between the 200 nm thick optical recording film 2 and the substrate 1. In the present embodiment as well as the below-discussed second through fifth embodiments (to be described later), the transparent dielectric film 4 is formed by sputtering.

Figure 8:
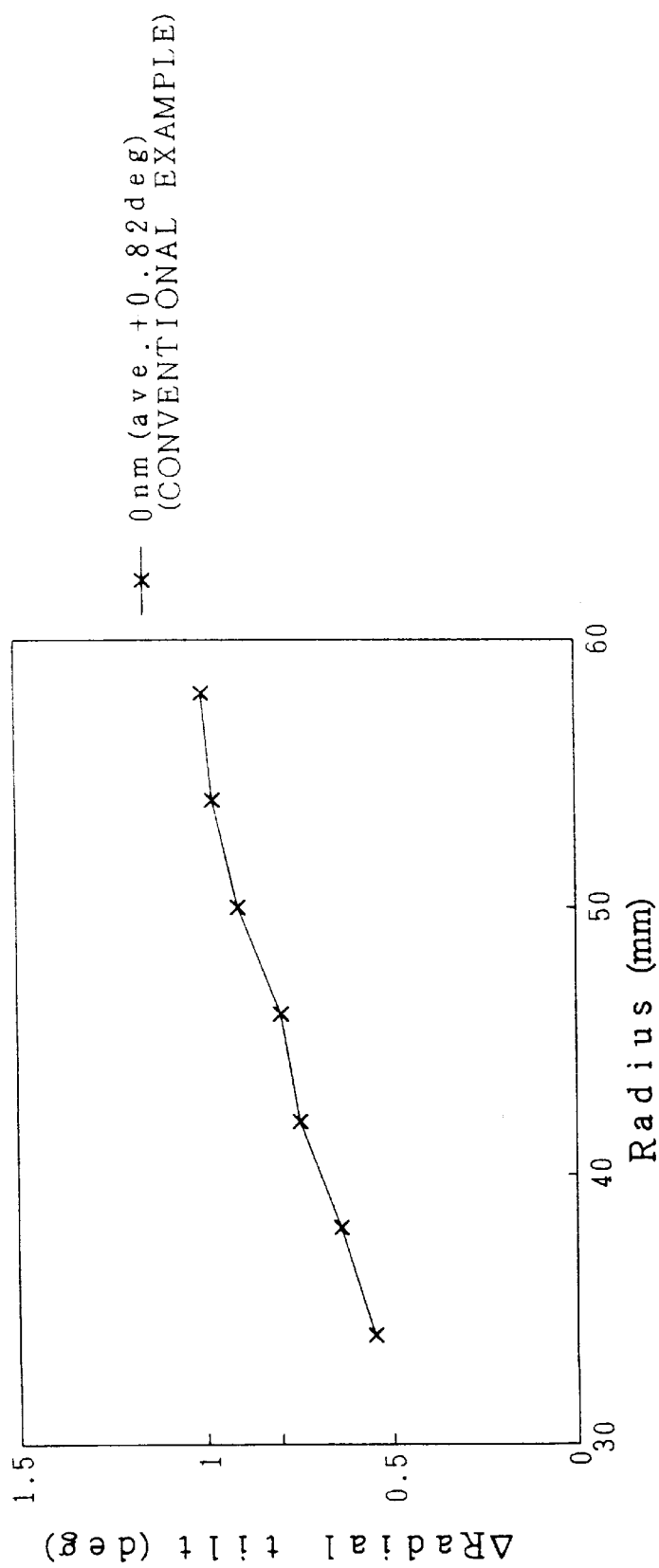
FIG. 8 is a graph showing a change in tilt of a conventional optical disk.

FIG. 2 shows a change in radial tilt in response to temperature changes (from 25° C. to 55° C.) of an optical disk. The conventional example explained earlier in FIG. 8 corresponds to the structure having the AlN film of 0 nm.

For all of the disks adopted in the present embodiment, the tilt is measured in the following manner irrespectively of the thickness of the AlN film of the transparent dielectric film 4. First, an optical disk is set in the measurement equipment in a thermostat, and the optical disk is rotated from the reference angle 90° by 90°. Then, a tilt is measured using a laser tilt measuring equipment in a radius range between 30 mm and 58 mm at every 4 mm. Tilt angles at respective radial positions are calculated based on the difference in displacement of the adjoining radial positions, and average tilt angles of respective radial positions 0°, 90°, 180° and 270° are calculated, and the resulting average tilt is determined to be a tilt at each radial position. The above measurement is carried out at 25° C. and 55° C. and at a relative humidity of 30%, and each measurement is performed after an elapse of a predetermined time from a time the temperature of the thermostat is stabilized. The same measurement is repeated at both 25° C. and 55° C., and a difference in tilts measured at 25° C. and 55° C. is determined to be changes in tilt.

When adopting a desirable optical disk, it becomes completely symmetrical with respect to the circumferential direction, and thus a change in tilt due to the bimetallic effects against the temperature change does not occur in the circumferential direction. In contrast, since the bimetallic effects have great effects in a radial direction, in the present embodiment, evaluation is made with respect to the radial direction only. The result of measurement shows that a change in circumferential tilt is significantly smaller than a change in radial tilt.

Figure 7:
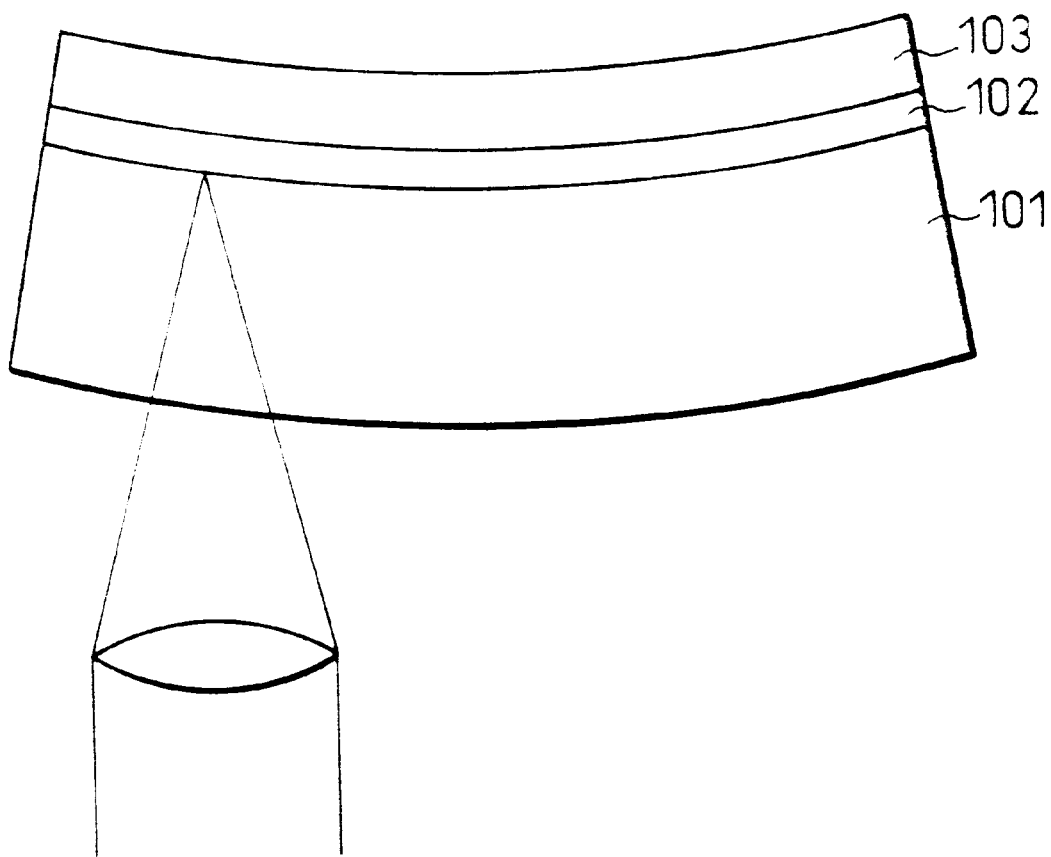
FIG. 7 is a cross-sectional view of a conventional optical disk which is warped due to bimetallic effects.

As shown in FIG. 2, in the conventional example (AlN film thickness of 0 nm), when increasing the temperature, as the coefficient of expansion of the substrate 101 is greater than the coefficient of expansion of the optical recording film 102, bimetallic effects are induced which causes a tilt in its expanding direction (see FIG. 7).

In the above conventional example, a radial tilt angle is increased by +0.82 deg on the average in response to a temperature change of 30° C. In the example adopting a film thickness of 30 nm, a radial tilt angle is increased by +0.5 deg on the average in response to a temperature change of 30° C. Similarly, in the examples in which film thicknesses are set to 60 nm, 100 nm, 150 nm and 200 nm respectively, changes in tilt angles on the average are +0.19 deg, +0.01 deg, -0.12 deg and -0.25 deg respectively. In Table 1, average changes in tilt angle are shown for respective film thicknesses of AlN.

TABLE 1

| AlN film thickness (nm) | Δ Radial tilt (deg) |
| --- | --- |
| 0 | +0.82 |
| (conventional example) | |
| 30 | +0.50 |
| 60 | +0.19 |
| 100 | +0.01 |
| (Example 1) | |
| 150 | -0.12 |
| 200 | -0.25 |

As can be seen from the results shown in Table 1, by forming the AlN film as the transparent dielectric film 4 on the light incident side (and coating it with the protective film), a change in tilt angle caused by a difference in coefficient of expansion and Young's modulus between the optical recording film 2 and the substract 1 can be reduced.

In the case where the optical recording film 2 includes a magneto-optical recording film of 200 nm thick, to prevent a change in tilt against temperature changes, the optimal film thickness is around 100 nm, and by a selection of the AlN film in the range between 30 nm and 200 nm, changes in tilt against temperature changes can be improved from the conventional level. Namely, with a selection of a film of the transparent dielectric film in the most proximity to the light incident side (AlN film in the present example) in the range between 30 nm and 200 nm, the transitional tilt of the optical disk, or changes in tilt due to the bimetallic effects caused by temperature changes can be prevented.

In the above measurement, respective tilts as measured at 25° C. are shown in Table 2 as initial radial tilts at room temperature.

TABLE 2

| AlN film thickness (nm) | Radial tilt (deg) |
| --- | --- |
| 0 | -0.18 |
| (conventional example) | |
| 30 | -0.16 |
| 60 | -0.12 |
| 100 | +0.02 |
| (Example 1) | |
| 150 | +0.18 |
| 200 | +0.22 |

As shown in Table 2, the conventional example shows an average radial tilt angle of -0.18 deg, and examples having AlN film thicknesses of 30 nm, 60 nm, 100 nm (Example 1), 150 nm, and 200 nm show average radial tilt angles of -0.16 deg, -0.12 deg, +0.02 deg, +0.18 deg and +0.22 deg respectively.

As can be seen from the results shown in Table 2, the internal stress generated when forming the optical recording film 2 remains in the direction of expanding the optical recording film 2, and the optical disk warps in the direction of releasing the internal stress. In contrast, in the optical disk having the transparent dielectric film 4 formed on the light incident side, the compression stress remains also in the transparent dielectric film 4, and this compression stress is exerted in the direction of cancelling the internal stress. The compression stress of the transparent dielectric film 4 increases as the film thickness increases, and when the internal stress of the optical stress of the optical recording film 2 balances with the internal stress of the transparent dielectric film 4, an initial tilt of the optical disk as a whole can be minimized. It can be seen from the results shown in Table 2 that the optical disk having a film thickness of 100 nm of the present embodiment shows the optimal effect of minimizing the tilt.

Namely, according to the structure of the first embodiment, the internal stress of the transparent dielectric film 4 is balanced with the internal stress of the optical recording film 2, whereby the initial tilt can be minimized. Moreover, bimetallic effects caused by temperature changes due to a difference in coefficient of thermal expansion between the optical recording film 2 and the substrate 1 can be suppressed, whereby a change in tilt can be minimized.

In order to see the dependency of an optimal film thickness of the transparent dielectric film 4 for suppressing a change in tilt against temperature changes on the film thickness of the optical recording film 2, five optical disks respectively including the 100 nm thick optical recording films 2, and the transparent dielectric films 4 of different film thicknesses (0 nm, 15 nm, 30 nm, 60 nm and 100 nm) are prepared, and the above measurement is repeated with respect to five optical disks thus fabricated. The respective results of the average change in radial tilt in response to temperature changes from 25° C. to 55° C. are shown in Table 3, and the results of the average radial tilt of the optical disk at room temperature are shown in Table 4. The above measurements are carried out under the same conditions as the aforementioned measurements on the samples having the 200 nm thick optical recording film 2. The results show that for both changes in radial tilt against temperature changes and the initial radial tilts at room temperature, an optimal film thickness is around 60 nm.

TABLE 3

| AlN film thickness (nm) | Δ Radial tilt (deg) |
|---|---|
| 0 | +0.63 |
| 15 | +0.52 |
| 30 | +0.30 |
| 60 | −0.06 |
| 100 | −0.22 |

TABLE 4

| AlN film thickness (nm) | Radial tilt (deg) |
|---|---|
| 0 | −0.16 |
| 15 | −0.14 |
| 30 | −0.08 |
| 60 | +0.04 |
| 100 | +0.15 |

It can be seen that in the arrangement wherein the transparent dielectric film 4 is formed on the light incident side for the purpose of suppressing the bimetallic effects, the optimal film thickness of the transparent dielectric film 4 varies substantially in proportion to the film thickness of the optical recording film 2.

The described internal stress of the thin film suggests a force exerted on a unit area of a cross section exerted from one side to the other side of the predetermined cross section. The internal stress more or less exits in the thin film prepared by vacuum evaporation, sputtering, or phase growth, etc., and is varied depending on such conditions as the physical properties of the thin film, the substrate, the thin film formation, etc. The value obtained from a product of the internal stress of the film and the film thickness is defined to be an "entire stress", and the tilt of the optical disk is determined based on the size of the entire stress and the direction in which the stress is applied.

According to the optical disk in accordance with the present embodiment, the entire stress of the optical recording film generated by the fabrication of the film is balanced with the entire stress of the transparent dielectric film 4 formed on the light incident side of the substrate 1 so as to suppress a generation of the radial tilt of the optical disk. Especially, to ensure the optimal condition, the film thickness of the transparent dielectric film 4 is varied so that the entire stress of the optical recording film 2 can be balanced with the transparent dielectric film 4. Even if the internal stress of the optical recording film 2 remains the same, the entire stress can be reduced to the half by reducing the film thickness to the half, and therefore, the film thickness of the transparent dielectric film 4 can be reduced to the half.

In the above preferred embodiment, the AlN is adopted for the transparent dielectric film 4 for the beneficial features over SiN to be adopted in the following second embodiment in its film forming speed, and thermal conductivity.

The reasons that the optimal thickness of the AlN for suppressing the bimetallic effects can be made thinner than the optical recording film 2 are as follows: That is, compared with the optical recording film 2, AlN has a smaller coefficient of thermal expansion, and thus the bimetallic effects caused by the extension of the substrate 1 having a larger thermal expansion than the optical recording film 2 can be suppressed effectively with a small thickness on the light incident side of the substrate 1.

[Second Embodiment]

The following descriptions will explain optical disks in accordance with another embodiment of the present invention.

In the present embodiment, a transparent dielectric film 4 made of SiN and an optical recording film 2 having a thickness of 200 nm are adopted.

In the present embodiment, six optical disks having different thicknesses (0 nm, 30 nm, 60 nm, 100 nm, 150 nm, and 200 nm) of SiN films (transparent dielectric films 4) are prepared, and changes in radial tilts (deg) in response to temperature changes and initial radial tilts are measured with respect to the six optical disks thus prepared. The results are shown in Table 5 and Table 6 respectively. For the above disks, the optical recording films 2 and the transparent dielectric films 4 are formed by sputtering.

TABLE 5

| SiN film thickness (nm) | Δ Radial tilt (deg) |
|---|---|
| 0 | +0.82 |
| 30 | +0.41 |
| 60 | +0.04 |
| 100 | −0.12 |
| 150 | −0.19 |
| 200 | −0.28 |

TABLE 6

| SiN film thickness (nm) | Radial tilt (deg) |
|---|---|
| 0 | −0.18 |
| 30 | −0.11 |
| 60 | −0.02 |
| 100 | +0.13 |
| 150 | +0.21 |
| 200 | +0.28 |

The above Table 5 shows the results of average radial tilts in response to temperature changes from 25 ° C. to 55° C. for all the disks each having different film thickness of the transparent dielectric film 4. Table 6 shows an average initial tilt for each of the above disks. The results show that for both changes in radial tilts against temperature changes and the initial tilts at room temperature, an optimal film thickness of the SiN is around 60 nm, and that the disks adopted in the present embodiment offer the same effects as achieved from the disks of the first embodiment adopting AlN films with a thinner structure.

In order to see the dependency of the optimal film thickness of the transparent dielectric film 4 for suppressing changes in radial tilt against temperature changes on the film thickness of the optical recording film 2, four optical disks including the optical recording film 2 with a thickness of 100 nm, and the transparent dielectric films 4 of different thicknesses (15 nm, 30 nm, 60 nm and 100 nm) respectively are prepared, and the measurement is carried out in the same manner as the First Embodiment. The respective results of the average changes in radial tilt in response to temperature ranges from 25° C. to 55° C. are shown in Table 7, and the results of the average radial tilt of the optical disk at room temperature are shown in Table 8. The above measurements are carried out under the same conditions as the first embodiment on the samples having the optical recording film 2 with a film thickness of 200 nm. The results show that for both changes in radial tilt in response to temperature change and the initial radial tilt at room temperature, optimal effects can be achieved when the film thickness is selected to be around 30 nm.

TABLE 7

| SiN film thickness (nm) | Δ Radial tilt (deg) |
|---|---|
| 0 | +0.63 |
| 15 | +0.45 |
| 30 | +0.04 |
| 60 | −0.12 |
| 100 | −0.30 |

TABLE 8

| SiN film thickness (nm) | Radial tilt (deg) |
|---|---|
| 0 | −0.16 |
| 15 | −0.08 |
| 30 | −0.02 |
| 60 | +0.04 |
| 100 | +0.16 |

Namely, like the case of the first embodiment, in the case of forming the transparent dielectric film 4 for the purpose of suppressing bimetallic effects on the light incident side, the results show that the optimal film thickness for the transparent dielectric film 4 is substantially in proportion to the film thickness of the optical recording film 2.

The SiN adopted for the transparent dielectric film 4 of the present embodiment is advantageous over the AlN adopted in the first embodiment in that the bimetallic effects caused by the optical recording film 2 can be suppressed with a smaller film thickness. Specifically, the SiN has significantly smaller coefficient of friction of linear thermal expansion as compared with that of the optical recording film 2 or AlN, and thus can suppress the bimetallic effects generated as the substrate 1, having a larger coefficient of friction than the optical recording film 2, expands more effectively with a small thickness formed on the light incident side of the substrate 1.

Also when adopting SlSiN which is a compound of an AlN used for the transparent dielectric film 4 and SiN adopted in the present embodiment, the same effects as achieved from the first and second embodiments can be achieved.

[Third Embodiment]

The following descriptions will explain optical disks adopted in still another embodiment of the present invention.

In the present embodiment, a transparent dielectric film 4 made of $SiO_2$ having a thickness of 200 nm is adopted.

In the present embodiment, four kinds of optical disks are prepared respectively including a 200 nm thick optical recording film 2 and $SiO_2$ films (the transparent dielectric films 4) of different thicknesses (200 nm, 300 nm, 400 nm, and 500 nm), and changes in radial tilt (deg) in response to temperature changes and initial radial tilts are measured with respect to the four disks thus prepared. The results are shown in Table 9 and Table 10 respectively.

TABLE 9

| $SiO_2$ film thickness (nm) | Δ Radial tilt (deg) |
|---|---|
| 0 | +0.82 |
| 200 | +0.79 |
| 300 | +0.51 |
| 400 | +0.10 |
| 500 | −0.19 |

TABLE 10

| $SiO_2$ film thickness (nm) | Radial tilt (deg) |
|---|---|
| 0 | −0.18 |
| 200 | −0.16 |
| 300 | −0.10 |
| 400 | +0.02 |
| 500 | +0.20 |

The above Table 9 shows the results of average radial tilts in response to temperature changes from 25° C. to 55° C. for all the disks each having different film thickness of the transparent dielectric film 4. Table 10 shows average value for initial tilt for each of the above disks. The results show that for both changes in radial tilt in response to temperature changes and the initial tilt, an optimal film thickness of the $SiO_2$ is around 400 nm, and that in order to ensure the same effects as achieved from the disks of the first and second embodiments, significantly larger film thickness is required.

However, the $SiO_2$ has the following beneficial properties. That is, as will be explained in the fourth embodiment, it is preferable that the coefficient of friction of the transparent dielectric film 4 be approximated to (more desirably smaller than) those of the substrate 1 and the second protective film 5, and thus the $SiO_2$ having the coefficient of friction of 1.46 is desirable for improving an utilization efficiency of light.

AlN, SiN and $SiO_2$ are adopted for the transparent dielectric film 4 in the described first through third embodiments. In the present, however, a material for the transparent dielectric film 4 is not limited to this, and for example, AlSiN, AlTaN, TaO, SiO, $TiO_2$, ZnS, $Al_2O_3$, SiAlOH, $MgF_2$, etc., may be adopted.

[Fourth Embodiment]

Figure 3:
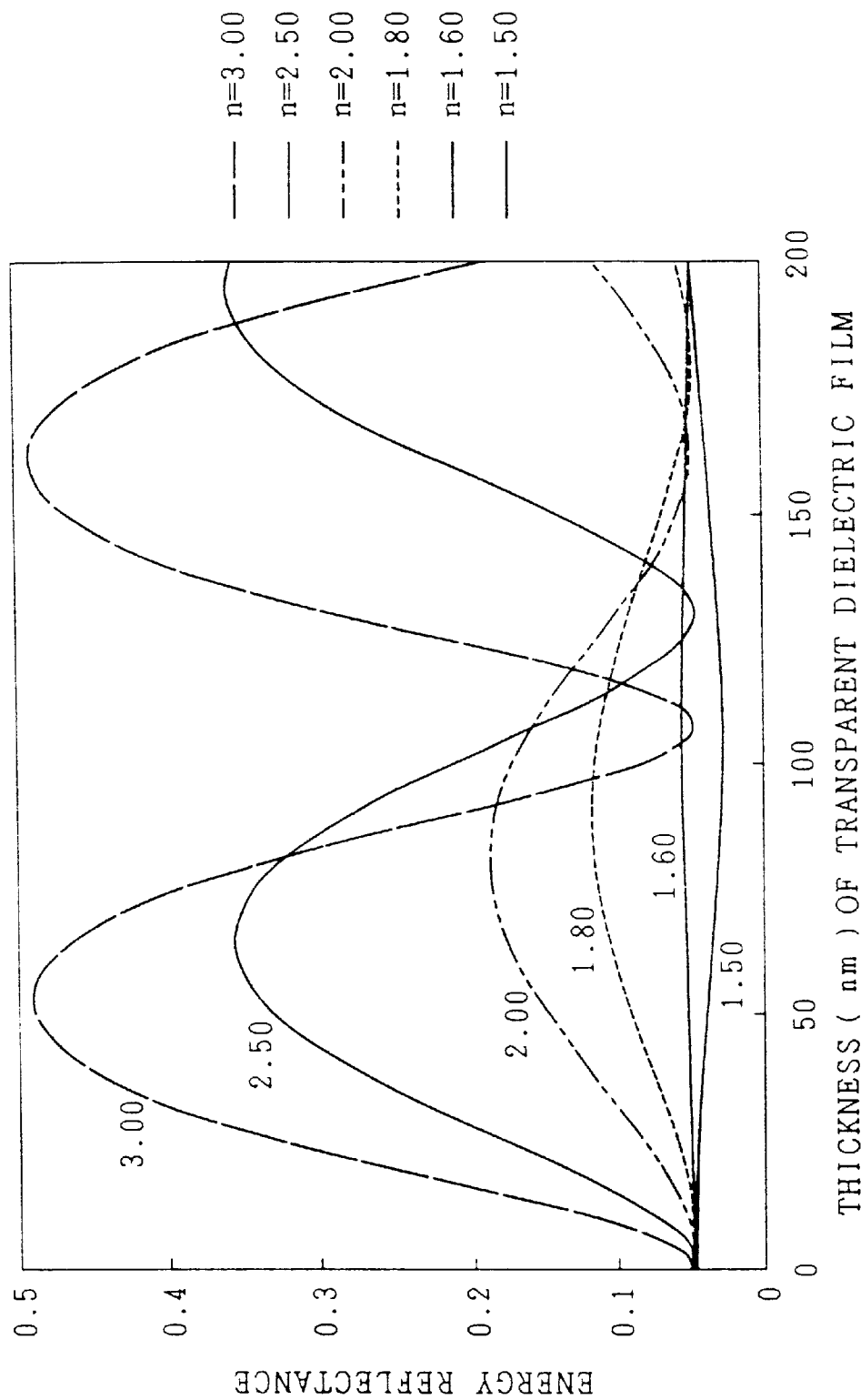
FIG. 3 is a graph showing a change in energy reflectance on the light incident side of an optical disk substrate in accordance with the fourth embodiment.

The following descriptions will explain optical disks in accordance with still another embodiment of the present invention in reference to FIG. 3.

The optical disks adopted in the present embodiment have the same film structure as the aforementioned first through third embodiments.

In the first through third embodiments, the transparent dielectric film 4 is formed on the light incident side of the substrate 1 to improve its tilt characteristics over an entire practical temperature range for disks, and suppress changes in tilt in response to temperature changes. In the described arrangement of the optical disk, however, recording and reproducing characteristics of signals may deteriorate depending on the coefficient of friction of the transparent dielectric film 4 and the film thickness. In the following, the cause of the deterioration of the recording and reproducing characteristics and the solution to such problem will be explained in detail.

A recording and/or reproducing of signals on and from the optical disk is carried out by projecting a light beam to be converged on the optical recording film and is reflected from the surface of the optical recording film (i.e., the interface between the substrate and the optical recording film).

In conventional optical disks (see FIG. 7), the light beam incident on the optical disk reaches only the optical recording film 102. Therefore, the light reflected from other portion than the optical recording film 102 is only the light reflected from the interface 106 between outside air and the substrate 101. For example, in the case where the substrate 101 is made of polycarbonate which is typically used for the substrate (coefficient of friction of 1.58), the energy reflectance on the interface 106 would be around 5%. Namely, 5% of the light beam cannot reach the optical recording film 102 and is reflected from the interface 106 resulting in a generation of the noise light different from an actual recording signal.

In contrast, in the optical disks of the first through third embodiments, the light beam incident on the optical disk passes through three layers of the second protective film 5, the transparent dielectric film 4 and the substrate 1 before reaching the optical recording film 2. For this reasons, before reaching the optical recording film 2, the light beam is reflected three times, i.e., at the interface 6 between the outside air and the second protective film 5, the interface 7 between the second protective film 5 and the transparent dielectric film 4 and the interface 8 between the transparent dielectric film 4 and the substrate 1.

Assume that the reflectance of the second protective film 5 be 1.50, which is the same as that of the substrate 1, then substantially the same amount of light (around 5% of the total amount of light) would be reflected from the first interface 6 when the light is incident thereon. The light beam which has passed through the second protective film 5 is further reflected from the interfaces 7 and 8, and not only that more noise light than the conventional arrangement is reflected, but also that the efficiency of utilizing light is lowered.

The energy reflectance at the interface is determined by the reflectances of the two layers sandwiching the interface, and the closer are these reflectances, the smaller is the resulting energy reflectance. Namely, in order to minimize the amounts of reflectance at the interfaces 7 and 8 so as to reduce the noise light, in the case of adopting the transparent dielectric film 4 having a larger reflectance than that of the substrate 1, it is required to reduce the reflectance of the transparent dielectric film 4 to be approximated to those of the substrate 1 and the second protective film 5. Specifically, in the case where the substrate 1 has the reflectance of 1.58 (in the case of polycarbonate which is typically used for the substrate), and the second protective film 5 has the reflectance of 1.50 (generally used polyurethane acrylate UV setting resin), it is required to reduce the reflectance of the transparent dielectric film 4 desirably to 1.58.

In the present embodiment, AlN is adopted for the transparent dielectric film 4 as in the first embodiment. The transparent dielectric film made of AlN, SiN, AlSiN, AlTaN, TaO, SiO, $SiO_2$, $TiO_2$, ZnS, $Al_2O_3$, SiAlOH, $MgF_2$, etc., is usually formed by a generally used sputtering device; however, by alternating the sputtering conditions, the reflectances of these materials can be varied in a range between around 1.7 and 2.6.

For example, the AlN, SiN, AlSiN and AlTaN films may be formed respectively using an Al or Si target, or AlSiN or AlTaN alloy target and by a reactive sputtering method using $N_2$ or $N_2$+Ar sputtering gas. Here, by changing the sputtering conditions such as the pressure or flow rate of the sputtering gas or a mixed ratio for the mixed gas if adopted, etc., the reflectances of these materials can be controlled in the above range.

In the present invention, it is preferable that the reflectance of the transparent dielectric film 4 be selected to be close to the reflectance of the substrate 1 (1.58) and the reflectance of the second protective film (1.50) as along as a Young's modulus and a thermal expansion which can suppress initial tilts and changes in tilt against temperature changes can be ensured.

Here, to see how the reflectance of the transparent dielectric film 4 affects the amount of reflection of the light beam before it reaches the optical recording film 2 which generates noise light, the simulation calculation is performed, and the results are shown in FIG. 3.

For the simplification of the calculation, assumed here that an air layer, and three layers of the second protective film 5, the transparent dielectric film 4 and the substrate 1 are formed in order from the light incident side. Then, the total energy reflectance when projecting the light beam to these three layers from the light incident side of the optical disk in a vertical direction is computed. In practice, as the optical recording film 2 is formed in a close proximity to the substrate 1, the energy reflectance exists at the interface 9. However, in this case, in order to see the energy reflectance experienced before the light beam reaches the interface 9, the light transmitted through the substrate 1 is assumed to be not reflected. Further, the wavelength of the light beam is assumed to be 650 nm which is adopted for DVDs. If not specified, it is hereinafter assumed that the wavelength $\lambda$ is 650 nm.

The reflectance of the air layer is 1.00, and the reflectance of the second protective film 5 is 1.50, and the reflectance of the substrate 1 is 1.58. Since the total film thickness of these three layers has a sufficient thickness for the wavelength $\lambda$ of the light beam, it is assumed that there is no multiple reflectance of light, and the thickness of the three layers are assumed to be indefinite. For the transparent dielectric film 4 respectively having the reflectances of 1.5, 1.6, 1.8, 2.0, 2.5 and 3.0, the film thickness is varied in the range of from 0 to 200 nm, and the results of energy reflectance are shown in FIG. 3.

The results of FIG. 3 show that at the reflectance n=1.60, the reflectance of the three layers of the substrate 1, the transparent dielectric film 4 and the second protective layer 5 is selected to be substantially the same, and the reflectance as a whole occurs mainly at the interface 6 between the air layer and the second protective film 5. This energy reflectance is substantially equivalent to that of the conventional arrangement which is around 5%. However, when the energy reflectance becomes large, i.e., n=2.5, at respective points of the film thickness of 65 nm and 195 nm, the energy reflectance is maximized, and becomes nearly around 40% of the energy reflectance for the following reasons.

Firstly, as the difference in reflectance between adjacent two layers becomes large, each energy reflectance of the interface 7 or 8 becomes large. Secondly, as the reflectance of the transparent dielectric film 4 becomes large, the optical path in the transparent dielectric film 4 becomes long, and the cycle of the multiple interference with respect to the film thickness becomes short. Namely, the reflectance with respect to the multiple interference is maximized at ¼ or ¾ of the wavelength of the light beam (i.e., the reflectance of the transparent dielectric film 4 is larger than the reflectance of the substrate 1 or the second protective film 5); however, in practice, the wavelength is a multiple of the reflectance of the film thickness, and the larger is the reflectance, the shorter is the cycle of the multiple interference with respect to an actual film thickness. Therefore, even with a small film thickness (50 to 100 nm), the reflectance becomes large due to the multiple interference.

Namely, other than signals, in order to reduce the amount of reflectance, the energy reflectance may be reduced by approximating the reflectance of the transparent dielectric film 4 desirably to be equivalent to the reflectance of the substrate 1 and the second protective film 5. The second method is to control the reflectance of the transparent dielectric film 4 so as to reduce the energy reflectance of the three layers on the light incident side due to the multiple-interference at an optimal film thickness of the transparent dielectric film 4 for improving the tilt characteristics described in the First Embodiment.

Specifically, assumed that the reflectance of the second protective film 5 and the reflectance of the substrate 1 are the values obtained by the simulation calculation. Then, in the first method, the reflectance of the transparent dielectric film 4 is approximated to 1.5 (if possible, to be functioned as the anti-reflection coating by further lowering the reflectance). In this case, as shown in FIG. 3, the energy reflectance can be suppressed to the conventional level, i.e., around 5% irrespectively of the film thickness of the transparent dielectric film 4. Therefore, the film thickness of the transparent dielectric film 4 can be set as desired, and the transparent dielectric film 4 may be set to an optimal film thickness (for example, 100 nm in the case of Example 1).

In the first method, however, the adjustable range for the reflectance of the transparent dielectric film 4 is limited, and depending on the material of the transparent dielectric film 4, the reflectance of the transparent dielectric film 4 may become larger or smaller than the reflectance of the second protective film 5 or the substrate 1. In such case, it is required to suppress the energy reflectance by adopting the second method.

Namely, in the case where the reflectance of the transparent dielectric film 4 is larger than the substrate 1, a reflectance may be calculated based on an optimal value for the film thickness for reducing changes in tilt (for example, 100 nm in Example 1) and a wavelength γ of the light beam. Specifically, when the reflectance of the transparent dielectric film 4 is approximated to a vicinity of an integer multiple of γ/2d (n=3.25 when the wavelength=650 nm and the film thickness=100 nm), at an optimal value of the film thickness of reducing changes in tilt, the energy reflectance due to multiple interference can be minimized, and an amount of light reflected before reaching the optical recording film 2 can be reduced. As the energy transmittance is maximized in this state, an improved utilization efficiency of light can be achieved.

In the case where the reflectance of the transparent dielectric film 4 is smaller than that of the substrate 1, by selecting the reflectance of the transparent dielectric film 4 be around an odd multiple of γ/4d, an anti-reflection coating can be formed.

In practice, with respect to optical disks adopting AlN for the transparent dielectric film 4, under the below-defined conditions, amounts of reflected light of the signals (wavelength of the light beam is 650 nm) are measured. The respective optical disks adopted in the present embodiment have common structures other than the transparent dielectric film 4. The optical disks all have 200 nm thick optical recording films 2 respectively. For the transparent dielectric films 4, those having different thicknesses (60 nm, 100 nm (Example 1) and 150 nm) which all show the reflectance of 2.00 and that has a thickness of 100 nm and a reflectance of around 1.80 (Example 2) are adopted. The results of measurements are also shown in Table 11. In Table 11, results achieved with respect to a conventional optical disk are also shown for comparison purpose.

TABLE 11

|  | AlN Reflectance | AlN Film-thickness (nm) | Amount of Reflected Light (%) | Amount of Light Wasted (%) | Calculated Transmittance (%) |
| --- | --- | --- | --- | --- | --- |
| Conv. Ex | — | 0 | 15.9 | 84.1 | 60.1 |
|  | 2.0 | 60 | 14.6 | 85.4 | 52.6 |
| Ex. 1 | 2.0 | 100 | 14.5 | 85.5 | 52.3 |
|  | 2.0 | 150 | 15.8 | 84.2 | 59.5 |
| Ex. 2 | 1.8 | 100 | 15.2 | 84.8 | 55.9 |

From the above results shown in Table 11, the following can be said. In the case where the reflectance of the transparent dielectric film 4 is 2.0, a greater amount of light is wasted than the case where the transparent dielectric film 4 having a film thickness of 100 nm (Example 1) is adopted. Further, in the case where the thickness of the transparent dielectric film 4 is selected to be 150 nm, the amount of wasted light is substantially the same level as the conventional arrangement. The results shown in Table 11 are identical with the results shown in FIG. 3 of the film thickness dependency of energy reflectance of the triplelayer structure of the second protective film 5, the transparent dielectric film 4 and the substrate 1 on the light incident side at n=2.00. The results of computation show that when the film thickness is selected to be 150 nm, d=γ/2n, and the energy reflectance caused by the multiple interference is substantially the same level as that of the conventional structure. Namely, in the above case having the film thickness of 150 nm, the amount of wasted light can be assumed to be the same level as the conventional level. From the results of actual measurement, the amount of wasted light is substantially the same level as the conventional level.

In respective cases where the film thickness is set to 60 nm and 100 nm (Example 1), as the energy reflectance caused by the multiple interference increases, it can be assumed that the actual amount of wasted light increases. When comparing the result obtained from the conventional structure with the results obtained from the structure having a thickness of 150 nm, the amount of wasted light increases. Therefore, even if the film thickness of the transparent dielectric film 4 is set to 100 nm for the purpose of improving the tilt characteristics, the energy reflectance would increases, and the amount of wasted light increases, resulting in optically not preferable conditions.

The results obtained from the Second Example adopting the optical disk including the transparent dielectric film 4 having the film thickness of 100 nm, which is the same as the Example 1, and the reflectance is altered to 1.80 by altering the conditions of forming the transparent dielectric film 4, the resulting amount of wasted light is between that obtained from the conventional example and that obtained from the Example 1. The results thereof are identical with the results shown in FIG. 3. Namely, when the film thickness of the transparent dielectric film 4 is set to 100 nm to improve the tilt characteristics of the optical disk, assumed that the reflectance of the transparent dielectric film 4 be 1.80. Then, the energy reflectance is between 1.60 and 2.00.

Namely, in the second embodiment, the results of improved effects of tilt characteristics as the first embodiment can be obtained. Further, by approximating the reflectance of the transparent dielectric film 4 to the substrate 1, the amount of wasted light as an optical disk can be reduced, whereby improved optical characteristics can be achieved.

In the case of adopting the second method of reducing the energy reflectance, it is advantageous that the reflectance of the transparent dielectric film 4 be approximated to the reflectance of the substrate 1.

As a result, an optical disk which is reliable both mechanically and optically can be realized. It is preferable that the energy reflectance in the three layers through which the light beam passes before it reaches the optical recording film 2 be not more than around 15%. It is also preferable that the difference in reflectance between the transparent dielectric film 4 and the substrate 1 be not more than 0.3. Therefore, in the case where the transparent dielectric film 4 made of AlN which is generally used for magneto-optical recording films, etc., at the reflectance of 2.00, it is preferable that the reflectance be not more than 1.90. Here, in the case where the AlN film of the transparent dielectric film 4 is 100 nm thick, the total energy reflectance at the three layers is around 14.7.

In the present embodiment, in order to achieve improved utilization efficiency of light, the energy reflectance on the light incident face of the substrate 1 has been considered, and an amount of light of the light beam before it reaches the optical recording film 2 is determined by the energy reflectance. Here, in the above model, the energy transmittance of the light from the interface 9 between the optical recording film 2 and the substrate 1 is computed. The results are also shown in Table 11.

It can be seen from the results that the energy transmittance of the light beam before it reaches the interface 9 corresponds to the amount of reflected light. Therefore, in the case of the optical disks of the present embodiment, by reducing the energy reflectance on the light incident side of the substrate 1, the energy transmittance can be improved, thereby obtaining the effects of improving an utilization efficiency of light of the optical disk as a whole.

The results of this measurement prove that the results by simulation calculation shown in FIG. 3 are appropriate. Namely, with an optimal selection for the film thickness d of the transparent dielectric film 4 for improving tilt characteristics, the energy reflectance can be minimized by controlling the reflectance n of the transparent dielectric film 4 to be an integer multiple of $\gamma/2d$, whereby highly reliable optical disk both mechanically and optically can be realized.

The material of the transparent dielectric film 4 is not limited to AlN. The reflectance of the transparent dielectric material differs depending on its material. In general, the reflectance of the transparent dielectric film 4 made of an inorganic substance is in a range between 1.7 and 2.6. However, as long as the effects described in the first embodiment and the effect of reducing the energy reflectance by approximating the reflectance of the transparent dielectric film 4 to that of the substrate 1 or the second protective film 5 by adjusting the preparing conditions of film 4, SiN, AlSiN, AlTaN, TaO, SiO, $SiO_2$, ZnS, $Al_2O_3$, SiAlOH, $MgF_2$ may be adopted for the transparent dielectric film 4.

Among all of the above-listed materials, optically, $SiO_2$ is especially preferable for the reason that the reflectance thereof is very small (1.46), and thus the amount of light reflected before it reaches the optical recording film 2 can be minimized. The same can be said for $MgF_2$ (reflectance: 1.38). As described, in the case where the reflectance of the transparent dielectric film 4 is smaller than that of the substrate 1, it is known that the energy reflectance is minimized when the film thicknesses is an odd integer multiple of $\gamma/4n$, which is called "anti-reflection coating".

The above anti-reflection coating appears in the results by simulation calculation shown in FIG. 3. Specifically, in the case where the reflectance of the transparent dielectric film 4 be 1.50, the energy reflectance is minimized in a vicinity of the film thickness of 120 nm. In the case of the present embodiment, by arranging such that the transparent dielectric film 4 serves as the anti-reflection coating, the energy reflectance on the optical light incident side of the substrate 1 can be still reduced. Therefore, in addition to the improved tilt characteristics, still improved optical effects can be achieved.

[Fifth Embodiment]

Figure 4:
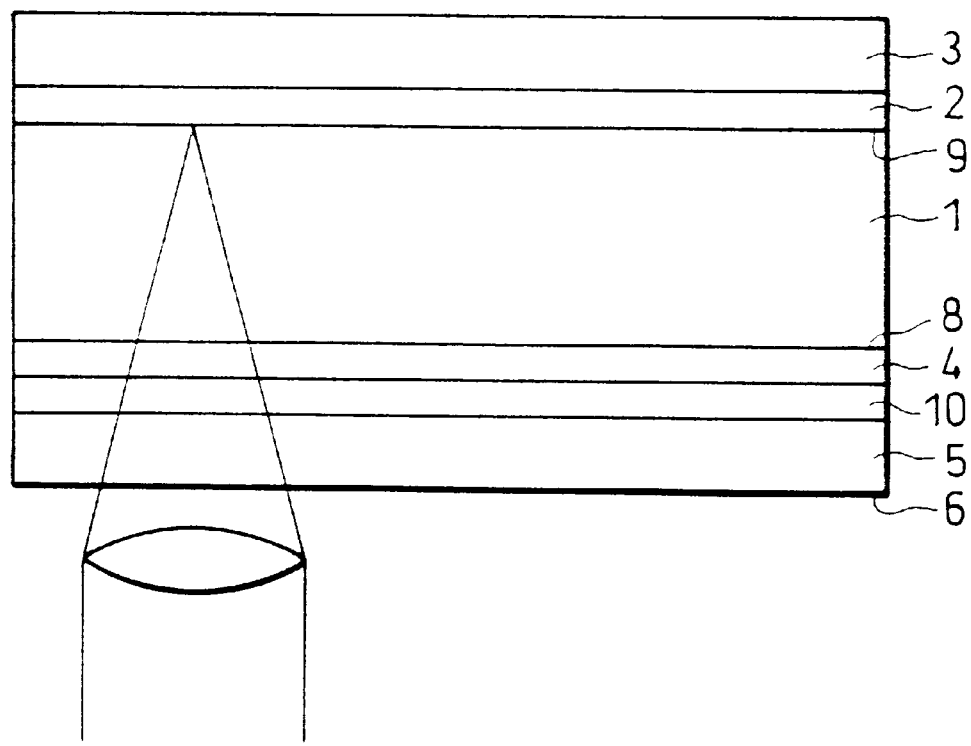
FIG. 4 shows a cross-sectional view schematically showing a structure of the optical disk in accordance with the fifth embodiment.
Figure 5:
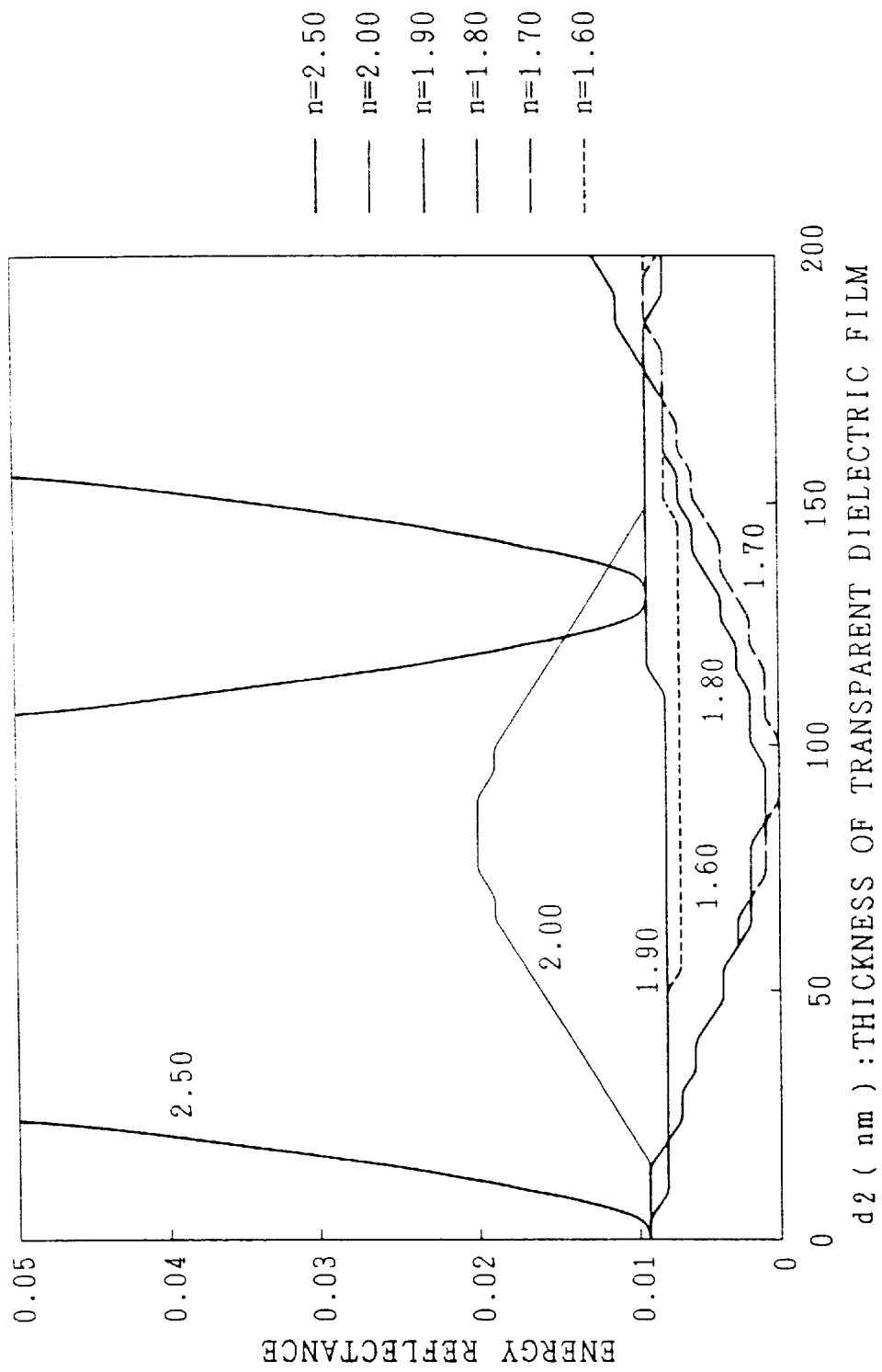
FIG. 5 is a graph showing an energy reflectance on the light incident side of the substrate of the optical disk in accordance with the fifth embodiment.
Figure 6:
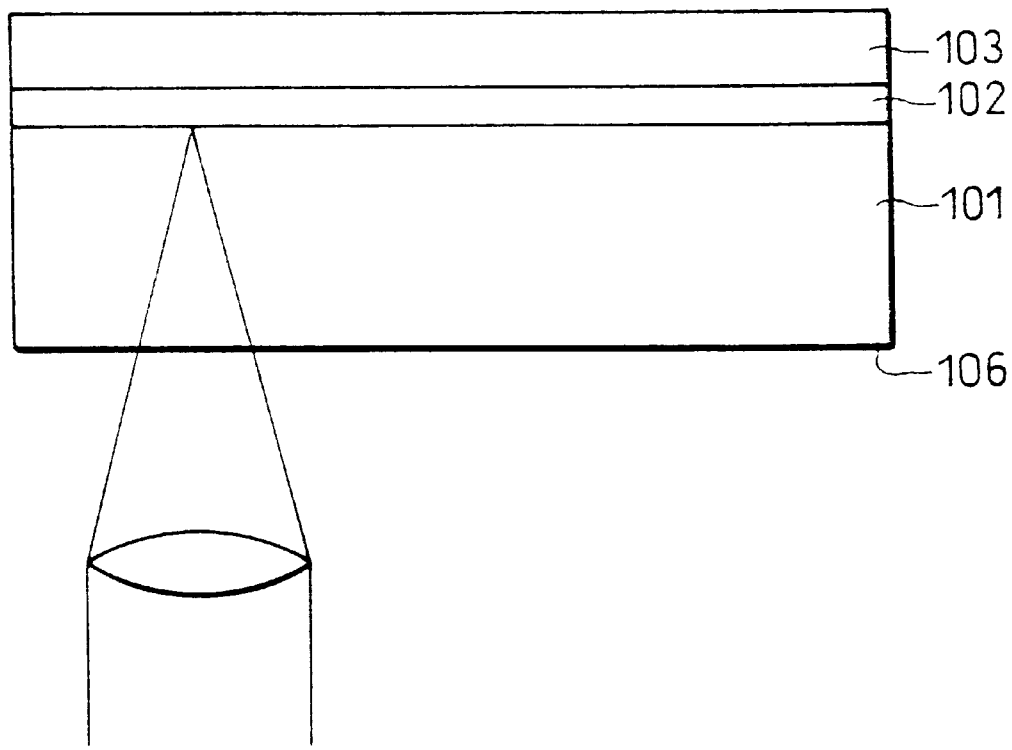
FIG. 6 is a cross-sectional view of a conventional optical disk.

The following descriptions will explain optical disks in accordance with still another embodiment of the present invention in reference to FIG. 4 and FIG. 5.

As shown in FIG. 4, the optical disk in accordance with the present embodiment is arranged so as to include an anti-reflection coating 10 of a single layer structure having different reflectance from that of the transparent dielectric film 4. The anti-reflection coating 10 is formed between the transparent dielectric film 4 and the second protective film 5 adopted in the first through fourth embodiments. Namely, the optical disk includes a second protective film 5, an anti-reflection coating 10, a transparent dielectric film 4 and a substrate 1 which are laminated in this order from the light incident side.

The anti-reflection coating 10 (reflectance: $n_1$, film thickness: $d_1$,) is made of a material having a smaller reflectance than the substrate 1 such as $MgF_2$ (n=1.38) or $SiO_2$ (n=1.46), etc. The anti-reflection coating 10 is selected to have a film thickness of an odd multiple of $\gamma/4n_1$ so as to reduce the energy reflectance on the light incident side of the substrate 1.

A variety of anti-reflection coating structures are known from a single layer structure to quadruple layer structure. In any anti-reflection coating structure, in the case where the layer formed on the light incident side is made a material of a small reflectance such as $MgF_2$ (n=1.38), etc., and the film thickness d is set to an odd multiple of $\gamma/4n$, the layer functions as the anti-reflection coating with respect to the light beam having the wavelength $\gamma$. A variety of such anti-reflection coating has been used in practical applications.

In the present embodiment, it is preferable to reduce the energy reflectance on the light incident side of the substrate 1; and thus the anti-reflection coating 10 on the light incident side of the transparent insulating film 4 related to multiple-interference is formed so as to satisfy the above conditions.

Examples of such material for the transparent dielectric film 4 include AlN, SiN, AlSiN, AlTaN, TaO, SiO, $SiO_2$, $TiO_2$, ZnS, $Al_2O_3$, SiAlOH, and $MgF_2$. In the present embodiment, the respective film thicknesses of the transparent dielectric film 4 and the anti-reflection coating 10 are set so as to improve tilt characteristics as a whole as described earlier in the first through third embodiments. However, a change in tilt characteristics caused by the bimetallic effects is determined mainly by the optical recording film 2 which has a direct contact with the substrate 1 and the transparent dielectric film 4.

In the same manner as the fourth embodiment, with respect to an optical disk including the air layer and the second protective film 5, the anti-reflection coating 10, the transparent dielectric film 4 and the substrate 1 formed in this order from the light incident side, the energy reflectance is calculated by simulation, and the results of the energy reflectance are as shown in FIG. 5.

In this example, the anti-reflection coating 10 made of $MgF_2$ having a reflectance $n_1$=1.38 is adopted. The wavelength of light is selected to be $\lambda$=650 nm, and the film thickness $d_1$ is selected to be $d_1=\lambda/4n_1$=118 (nm). Here, by varying the reflectance $n_2$ of the transparent dielectric film 4, the dependency of the energy reflectance on the film thickness $d_2$ is computed.

The results of FIG. 5 show that in a wide $n_2$ range between 1.6 and 1.9, low energy reflectance of not more than 1 percent is obtained irrespectively of the film thickness $d_2$ of the transparent dielectric film 4. The above experiment is carried out with respect to the optical disks having $d_2$ of not more than 200 nm; however, as the energy reflectance is a periodic function of the film thickness $d_2$, the same results would be obtained for those having the film thickness $d_2$ other than 200 nm. The described feature of suppressing the energy reflectance on the light incident side of the substrate 1 to be not more than 1% is desirable in terms of increasing the light utilization efficiency.

Next, the same simulation calculation is performed with respect to an optical disk adopting the anti-reflection coating 10 made of $SiO_2$ ($n_1$=1.46). The wavelength of light is selected to be $\lambda$=650 nm, and the film thickness $d_1$ is selected to be $d_1=\lambda/4n_1$=111 (nm). Here, by varying the reflectance $n_2$ of the transparent dielectric film 4, the dependency of the energy reflectance on the film thickness $d_2$ is computed.

The results of FIG. 5 show that in the $n_2$ range between 1.6 and 2.0, low energy reflectance of not more than 2 percent is obtained irrespectively of the value for $d_2$.

It is preferable that the anti-reflection coating 10 have a reflectance $n_1$ of a square root of a product of the reflectance of the substrate 1 and the reflectance of air, however, it is difficult to adopt those which satisfy the above conditions and offer stability both chemically and mechanically. In practice, $MgF_2$ of n=1.38 is the most preferable for the anti-reflection coating 10, and has been used in many applications. However, in the case where the energy reflectance is not needed to be eliminated completely, improved optical characteristics can be achieved even when adopting a material having a smaller reflectance than $MgF_2$, such as $SiO_2$ (n=1.46).

The described results of simulation calculation show that by adopting the anti-reflection coating 10 which satisfies the above conditions, while maintaining the energy reflectance of the substrate 1 on the light incident side to be not more than 1 to 2 percent, the thickness $d_2$ of the transparent dielectric film 4 can be set as desired. This permits an optimal selection for $d_2$ of the transparent dielectric film 4 for improving tilt characteristics, thereby achieving the effects as achieved from the first through fourth embodiments of improving the tilt characteristics and the effect of improving optical characteristics at the same time. Moreover, as the above arrangement permits a selection of the reflectance $n_2$ of the transparent dielectric film 4 in the range between 1.6 and 1.9, the material which can offer improved tilt characteristics efficiently with a small film thickness can be set as desired.

In the present embodiment, in order to achieve the effect that the anti-reflection coating 10 can be prepared in the same manner as the case of forming the optical recording film 2 using the sputtering device, three optical disks are actually prepared adopting $SiO_2$ for the anti-reflection coating 10. With respect to the optical disks thus prepared, an amount of reflected light of the signal of the optical disk is prepared in the same manner as Example 4.

In any optical disks, the anti-reflection coating 10 is prepared from $SiO_2$ with a reflectance $n_1$=1.46 so as to have a film thickness $d_1=\lambda/4n_1$=111 (nm) by sputtering. For the transparent dielectric film 4, AlN is adopted as in the first and fourth embodiments. The respective thicknesses of the transparent dielectric film 4 made of AlN are selected to be 60 nm, 100 nm (Example 3) and 150 nm. For all transparent dielectric films 4, the sputtering conditions are set so as to the reflectance $n_2$ of 1.80. Other than the above, the structure of the optical disks adopted in the present embodiment are the same as those of the fourth embodiment.

The results of measurements of the amount of reflectance of the optical signal are shown in Table 12. For comparison, the results of the conventional example and the results of (Example 2) are also shown in Table 12.

TABLE 12

| | $SiO_2$ film thickness (nm) | AlN Reflectance | AlN film thickness (nm) | Luminous Energy of Reflected Light (%) | Calculated Transmittance (%) |
|---|---|---|---|---|---|
| Conv. Ex. | — | — | — | 15.9 | 60.1 |
| Ex. 2 | — | 1.8 | 100 | 15.2 | 55.9 |
| | 111 | 1.8 | 60 | 16.4 | 62.9 |
| Ex. 3 | 111 | 1.8 | 100 | 16.5 | 63.2 |
| | 111 | 1.8 | 150 | 16.3 | 62.3 |

As a result, it can be seen that the structure of the Example 3 shows the largest luminous energy of reflected light and utilization efficiency of light. This can support the described results of calculation of the energy reflectance and the transmittance on the light incident side of the substrate 1. Although not shown in Table 12, the structure of the third embodiment also shows the excellent effects of improving the tilt characteristics. Therefore, an optical disk which can improve both the tilt characteristics and the optical characteristics can be obtained.

Additionally, the results of the above measurements of the transmittance and the luminous energy of reflected light are less affected by the film thickness $d_2$ of the transparent dielectric film 4 as compared with the results obtained from the measurements of the fourth embodiment. Namely, by setting the optical conditions of the reflectance and the film thickness for the anti-reflection coating 10, the reflectance and the film thickness of the transparent dielectric film 4 which provide improved tilt characteristics can be set as desired. Therefore, the thickness of the transparent dielectric film 4 can be optimized for improving the tilt characteristics with high precision.

The structure of the anti-reflection coating 10 is applicable not only to a single-layer structure but also to multi-layer structure such as a doublelayer structure, a triplelayer structure, and a quadruple layer structure. However, the Nth-layer structure of the anti-reflection coating 10 offers a wide wavelength range on theory as zero reflectance can be obtained at N wavelengths.

However, in practice, as optical disks such as those adopted in the present invention are optimized so as to utilize a specific laser wavelength, it is sufficient if the reflectance can be reduced at one wavelength. Furthermore, even if the multilayer structure of the anti-reflection coating 10 is adopted, the reflectance may increase even at the small incident angle of incident light.

As explained earlier, in order to reduce the energy reflectance to not more than 1 to 2 percent, the doublelayer structure of the transparent dielectric film 4 and the anti-reflection coating 10 offer sufficient effects. Also in the case of adopting the anti-reflection coating 10 of a triplelayer structure, it is known that the layer in the closest proximity to the light incident side can serve as the anti-reflection coating under the same condition as the described anti-reflection coating 10 of the doublelayer structure.

According to the described structures of the first through fifth embodiments, the beneficial characteristics obtained by adopting the transparent dielectric film 4 made of AlN, SiN, SlSiN, AlTaN, TaO, SiO, $SiO_2$, $TiO_2$, ZnS, $Al_2O_3$, SiAlOH, and $MgF_2$ will be explained.

Any of the above material is formed on the single side or both sides of the magneto-optical recording film for preventing the oxidation of the rare earth—transition metal alloy film adopted in the magneto-optical recording film of the optical recording film 2 in the optical disks, particularly, the optical disks of the magneto-optical recording system. Accordingly, the above material is suited for the prevention of humidity and oxidation which offers the long term reliability of the magneto-optical disk. The layer of the above material functions not only as the anti-humidity/oxidation layer, but also as the enhancement layer of the magneto-optical effects for improving a signal quality.

The above material is used not only for the optical disks of the magneto-optical recording system but also for the optical disks of the phase change type recording system or other systems, for example, in the protective layer for preventing the oxidization of the recording layer and ensuring the long term reliability in the multilayer structure of the interference layer for enhancing the recording signal.

Furthermore, in the case of the optical disk of the recording system, the transparent dielectric film 4 can be fabricated by utilizing the thin film manufacturing device such as a sputtering device for use in the fabrication of the optical recording film 2. Thus, the above material is beneficial in its fabrication efficiency.

The transparent dielectric layer 2' in the optical recording film 2 for use in the recording system is arranged so as to have an improved reflectance and a thinner structure for the purpose of obtaining the multi-interference effects which offers an improved fabrication efficiency. Therefore, materials having high reflectance are desirable. Therefore, as explained in the fourth embodiment, to proximate the reflectance of the transparent dielectric film 4 to that of the substrate 1 is contrary to the case of preparing the transparent dielectric layer 2' in the optical recording film 2.

Namely, in the case of preparing the transparent dielectric film 4 from the same material as the optical recording film 2 utilizing the thin film manufacturing device such as the sputtering device for the purpose of improving fabrication efficiency, it is desirable that the reflectance be varied by varying the sputtering conditions. The described arrangement wherein the optical recording film 2 includes the transparent dielectric layer 2' which is prepared from the same material as the transparent dielectric film 4 but has a different reflectance from that of the transparent dielectric film 4 offers such an effect that the transparent dielectric film 4 can be formed using the thin film manufacturing device such as a sputtering device for use in forming the optical recording film 2, which are effective in the manufacturing processes. Specifically, it is preferable that the reflectance of the transparent dielectric layer 2' of the optical recording film 2 be large, and the reflectance of the transparent dielectric film 4 be small.

The optimal film thickness of the transparent dielectric film 4 for improving the tilt characteristics described in the first through fifth embodiments will be explained. In any of the structures of the first through fifth embodiments, the optical recording film having a total thickness of 200 nm, and a magneto-optical recording film having a thickness of 100 nm is adopted; however, the present invention is not limited to the magneto-optical recording film. Namely, the present invention is applicable to various types of optical recording media adopted in magneto-optical disks, CDs, DVDs, rewritable optical disks, photochromic disks, or phase change type disks, etc. Namely, the essential structures of the present invention lie in that a specific transparent dielectric film 4 is formed on the light beam incident face of the substrate, and bimetallic effects caused by the difference in thermal expansion between the optical recording film 2 and the substrate 1 can be suppressed by the transparent dielectric film 4 formed on the opposite side.

In this case, depending on the material and the film thickness of the optical recording film 2, the optimal film thickness d (nm) of the transparent dielectric film 4 differs. In general, however, with respect to the film thickness x(nm) of the optical recording film 2, it is desirable that the condition of $0.1x<d<x$ be satisfied when adopting the AlN, SiN or AlSiN for the transparent dielectric film 4, and the condition of $x<d<3x$ be satisfied in the case of adopting $SiO_2$ for the transparent dielectric film 4.

As described, in each of the described preferred embodiments, the optical disk is structured so as to include the optical recording film 2 formed on one surface of the transparent substrate 1, the first protective film 3 formed on the surface of the optical recording film 2, the transparent dielectric film 4 formed on the other surface of the substrate 1, and the second protective film 5 formed on the surface of the transparent dielectric film 4. Further, the transparent dielectric film 4 is selected so as to have an optimal effect of suppressing the bimetallic effects caused by the difference in thermal expansion between the optical recording film 2 and the substrate 1.

The optical disk of the present invention is not particularly limited, and known optical disks such as Magneto-Optical Disks, Compact Disks, Digital Video Disks, Write Once Type Optical Disks, Photochromic Disks, and Phase Change Type disks may be adopted. The essential features of the present invention lie in that a specific transparent dielectric film 4 is formed on the light incident side of the substrate, which offers the effects of suppressing the bimetallic effects caused by the difference in thermal expansion between the optical recording film 2 and the substrate 1.

In this case, depending on the material or film thickness of the optical recording film 2, the optimal film thickness d (nm) of the transparent dielectric film 4 for optimizing the effects of improving the tilt characteristics also differ. However, in the case of adopting the transparent dielectric film 4 made of AlN, SiN, or AlSiN, it is preferable that the optimal film thickness d (nm) of the transparent dielectric film 4 be in the range of $0.1x<d<x$ wherein x (nm) indicates the film thickness of the optical recording film 2. In the case of adopting the transparent dielectric film 4 made of $SiO_2$, it is preferable that the optimal film thickness d (nm) of the transparent dielectric film 4 be in the range of $x<d<3x$.

As described, the optimal disk in accordance with each embodiment of the present invention is arranged so as to include an optimal recording film 2 formed on one surface of the transparent substrate 1, the first protective film 3 formed on the surface of the optical recording film 2, the transparent dielectric film 4 formed on the other surface of the substrate 1, and the second protective film 5 formed on the surface of the transparent dielectric film 4. The thickness of the transparent dielectric film 4 is adjusted so as to suppress the bimetallic effects due to the thermal expansion between the optical recording film 2 and the substrate 1.

As described, present invention offers a solution to the outstanding problems for the substrate 1 of a thin structure suited for the high density recording. That is, by providing the transparent dielectric film 4 on the light incident side of the substrate 1 and the second protective film 5 on the surface of the transparent dielectric film 4, the bimetallic effects due to the difference in thermal expansion between the optical recording film 2 and the substrate 1 can be suppressed by the transparent dielectric film 4 formed on the opposite side of the substrate 1. As a result, the entire stress of the optical recording film 2 generated in the fabrication process is substantially balanced with the entire stress of the transparent dielectric film 4, thereby obtaining the improved effects for the initial tilt characteristics.

With the transparent dielectric film 4 formed on the light incident side of the substrate 1 provided for improving the tilt characteristics, the amount of reflected light before the light beam reaches the optical recording film 2 increases, which results in the problems not only in that the utilization efficiency of light is reduced but also in that a noise signal is contained. However, the above problems can be prevented by selecting the difference in reflectance between the transparent dielectric film 4 and the substrate 1 be not more than 0.3 so as to reduce the reflectance by adjusting the fabrication conditions of the transparent dielectric film to be approximated to the reflectance of the substrate 1. As a result, the energy reflectance on the light incident side of the substrate 1 can be reduced so as to improve the utilization efficiency of light, thereby improving the signal characteristics.

The problem that the utilization efficiency of light is lowered by the transparent dielectric film 4 can be eliminated by the optimal selection for the reflectance of the transparent dielectric film 4 as follows. Namely, in the case where the reflectance n of the transparent dielectric film 4 is larger than the reflectance of the substrate 1, it is preferable that the reflectance n be around an integer multiple of $\gamma/2d$ by controlling the fabrication conditions of the transparent dielectric film 4, whereby improved utilization efficiency of light can be achieved by reducing the amount of reflected light on the light incident side of the substrate 1.

On the other hand, in the case where the reflectance n of the transparent dielectric film 4 is smaller than the reflectance of the substrate 1, the reflectance n be set around an odd multiple of $\gamma/4d$ by adjusting the fabrication conditions of the transparent dielectric film 4, whereby improved utilization efficiency of light can be achieved by reducing the amount of reflected light on the light incident side of the substrate 1.

Additionally, by forming the transparent dielectric film 4 from any of the material selected from the group consisting of AlN, SiN, AlSiN, AlTaN, TaO, SiO, $SiO_2$, $TiO_2$, ZnS, $Al_2O_3$, SiAlOH and $MgF_2$, a sufficient transparency as well as improved initial tilt and changes in tilt against temperature changes can be achieved.

Further, by arranging such that the transparent dielectric film 4 is made of either one of AlN, SiN and AlSiN, and the film thickness d (nm) of the transparent dielectric film 4 satisfies the condition of 0.1x<d<x, improved tilt characteristics of the optical disk can be achieved.

Specifically, in the case of adopting the transparent dielectric film made of AlN, by reducing the reflectance of the transparent dielectric film 4 be not more than 1.90 by adjusting the conditions for the fabrication of the transparent dielectric film 4, the reflectance of the transparent dielectric film 4 is proximate to the reflectance of the substrate 1 so as to lower the energy reflectance on the light incident side of the substrate 1 and reduce the amount of reflected light, whereby improved signal characteristics can be achieved.

In the case of adopting $SiO_2$ for the material of the transparent dielectric film 4, by selecting the film thickness d (nm) of the transparent dielectric film 4 so as to satisfy the condition of 0.1x<d<x wherein x is the film thickness (nm) of the optical recording film 2, desirable tilt characteristics of the optical disk can be achieved.

In view of the manufacturing efficiency, it is preferable that the optical recording film 2 has a common element with the transparent dielectric film 4 and include the transparent dielectric layer 2' which has a different reflectance from that of the transparent dielectric film 4 as the thin film manufacturing device such as the sputtering device for use in fabricating the optical recording film 2 can be used for the fabrication of the transparent dielectric film 4.

In the structure wherein an anti-reflection coating 10 of a single-layer structure having different reflectance from the transparent dielectric film 4 is formed between the transparent dielectric film 4 and the second protective film 5, it is preferable that the layer in the closest proximity to the light incident side of the anti-reflection coating 10 satisfy the conditions that $n_1$ is smaller than the reflectance of the substrate 1, and $n_1 \times d_1$ is almost an odd multiple of $\gamma/4$.

As a solution to the problem of lowering the utilization efficiency of light compared with the conventional optical disks due to the transparent dielectric film 4, by reducing the energy reflectance on the light incident side of the substrate and increasing the energy transmittance, improved utilization efficiency which offers improved signal characteristics can be achieved by selecting an optimal material for the transparent dielectric film 4 and an film thickness as desired. As a result, both tilt characteristics and optical characteristics can be improved from the conventional level.

In each of the described preferred embodiments, there is no numerical correlation between the thickness of the substrate 1 and the film thickness of the transparent dielectric film 4. Namely, the present invention offers a solution to the problem arising when reducing the film thickness of the substrate 1 which has not been experienced for the conventional thickness. It can be assumed that since the substrate of the thin structure has a small flexural rigidity, although the optimal thickness for suppressing the tilt of the transparent dielectric film 4 greatly depends on the film thickness of the optical recording film 2, it is hardly affected by the thickness of the substrate 1.

The resin is used for the material of the substrate 1 in view of cost and performance, and in each of the described preferred embodiments, polycarbonate is used. In the present invention, the material of the substrate 1 is not limited to the above. However, depending on the type of the resin adopted, the coefficient of linear thermal expansion, the coefficient of flexural rigidity and the reflectance which are the essential factors of the present invention differ. However, compared with the differences in physical values caused by the difference in material for the optical recording film 2 and the transparent dielectric film 4, the difference is significantly small, and it can be assumed that respective physical values are substantially the same irrespectively of the material used in the substrate 1.

In the described preferred embodiments, explanations have been given through the case of forming the second protective film 5 on the light incident side of the transparent dielectric film 4 or the anti-reflection coating 10. However, since the transparent dielectric film 4 or the anti-reflection coating 10 has sufficient durability with respect to the applicable environment (for example, those made of $SiO_2$ or $MgF_2$, etc.), the second protective film 5 may be omitted. With or without the second protective film 5, optical conditions differ. However, since the optical purpose of the present invention is to reduce the reflectance by the multiple interference, as long as the reflectance can be reduced by setting the film thickness and the reflectance, it is possible to omit the second protective film 5. For example, the anti-reflection coating used in the practical applications is arranged so as to form $MgF_2$ on the surface thereof to be durable without the second protective film 5.

The optical disk of the present invention which is arranged so as to include the optical recording film formed on one of the surfaces of the transparent substrate and the first protective film formed on the surface of the optical recording film may be arranged so as to include the transparent dielectric film for suppressing the bimetallic effects caused by difference in thermal expansion between the optical recording film and the substrate, the transparent dielectric film being formed on the other surface of the transparent substrate.

According to the described effects, the transparent dielectric film is provided on an opposite side (light incident side of the substrate) to the optical recording film with respect to the substrate so as to improve the tilt characteristics due to the bimetallic effects caused by differences in thermal expansion between the optical recording film and the substrate, which becomes noticeable for the thin substrates suited for high density recording.

Here, with an optical selection of the physical values of the transparent dielectric film, the bimetallic effects due to the thermal expansion between the optical recording film and the substrate can be suppressed by the transparent dielectric film formed on an opposite side. As a result, the entire stress of the optical recording film generated in the fabrication process is balanced with the entire stress of the transparent dielectric film, whereby improved effects can be achieved also for the initial tilt characteristics.

In the case where the transparent dielectric film is made of any one of AlN, SiN and AlSiN, it is preferable that the film thickness d (nm) of the transparent dielectric film satisfy the condition of $0.1x<d<x$, wherein x is the film thickness (nm) of the optical recording film.

According to the above arrangement wherein the transparent dielectric film is made of any one of AlN, SiN and AlSiN, by selecting the film thickness d (nm) of the transparent dielectric film AlN so as to satisfy the condition of $0.1x<d<x$, improved tilt characteristics of the optical disk can be achieved.

It may be also arranged such that the transparent dielectric film is made of $SiO_2$, and the film thickness of the transparent dielectric film is selected so as to satisfy the condition of $x<d<3x$ wherein x (nm) is the film thickness of the optical recording film.

According to the described arrangement, by selecting the film thickness of the transparent dielectric film so as to satisfy the condition of $x<d<3x$ wherein x is the film thickness (nm) of the optical recording film, improved tilt characteristics of the optical disk can be achieved.

It may be also arranged such that the reflectance n of the transparent dielectric film is larger than the reflectance of the substrate and is an integer multiple of $\gamma/2d$.

Due to the transparent dielectric film formed on the light incident side of the substrate for improving the tilt characteristics, the amount of reflected light before the light beam reaches the optical recording film increases, which raises the problems not only in that the utilization efficiency of light is reduced but also in that a noise signal is contained.

In contrast, according to the described arrangement, in the case where the reflectance n of the transparent dielectric film is larger than the reflectance of the substrate, by selecting the reflectance n to be an integer multiple of $\gamma/2d$ by controlling the fabrication conditions, an amount of reflected light on the light incident side of the substrate can be reduced, whereby an improved utilization efficiency of light and improved signal characteristics can be achieved.

It may be also arranged such that the reflectance n of the transparent dielectric film is smaller than the reflectance of the substrate and is an odd multiple of $\gamma/4d$, wherein d is a film thickness (nm), and $\gamma$ is a wavelength (nm) of the light beam to be projected on an optical disk.

According to the described arrangement, the problem of reducing the utilization efficiency of light compared with the conventional optical disk by the transparent dielectric film can be solved by the following arrangement. That is, in the case where the reflectance n of the transparent dielectric film is smaller than the reflectance of the substrate, by arranging such that the reflectance n to be around an odd multiple of $\gamma/4d$ by adjusting the film fabrication conditions, the amount of light reflected on the light incident side of the substrate can be reduced, and the utilization efficiency of light can be improved, thereby improving signal characteristics.

The optical disk of the present invention may be arranged so as to include an anti-reflection coating of at least single-layer structure which is formed adjacent to the light incident side of the transparent dielectric film so as to have different reflectance from the transparent dielectric film, wherein $n_1$ is smaller than the reflectance of the substrate, and the reflectance is around an odd multiple of $\gamma/4d_1$ wherein $n_1$ is the reflectance of the layer in the anti-reflection coating which is formed in the closest proximity to the light incident side, $d_1$ is the film thickness (nm) of the anti-reflection coating, and $\gamma$ is the wavelength (nm) of the light beam to be projected on the optical disk.

The described arrangement offers a solution to the described problems, i.e., the problems of lowering the utilization efficiency of light compared with the conventional optical disk by the transparent dielectric film. Specifically, the anti-reflection coating of a single-layer structure is provided and the layer in the closest proximity to the light incident side of the anti-reflection coating is arranged so as to satisfy the above optical conditions, the material and the film thickness of the transparent dielectric film can be set as desired to achieve improved tilt characteristics. As a result, the energy reflectance on the light incident side of the substrate can be reduced, and the energy transmittance can be improved, whereby improved signal characteristics can be achieved by improving the utilization efficiency of light. As a result, improved tilt characteristics and the optical characteristics can be achieved at the same time.

The optical disk of the present invention may be arranged so as to include the second protective film formed on the light incident side.

According to the described arrangement, the second protective film is formed on the surface of the transparent dielectric film or the anti-reflection coating formed on the light incident side of the optical disk, and a durable transparent dielectric film or the anti-reflection coating in the operable environment can be achieved.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An optical disk, comprising:
   a transparent substrate;

an optical recording film formed on one surface of said transparent substrate; and a transparent dielectric film for suppressing bimetallic effects due to a difference in thermal expansion between said optical recording film and said transparent substrate, said transparent dielectric film being formed on another surface of said transparent substrate opposite to said optical recording film so as to sandwich said transparent substrate therebetween.

2. The optical disk as set forth in claim 1, wherein:

said transparent dielectric film is made of a material of a group consisting of AlN, SiN and AlSiN, and has a thickness d (nm) satisfying the following formula, $$0.1x<d<x,$$

wherein x is a film thickness (nm) of said optical recording film.

3. The optical disk as set forth in claim 1, wherein:

said transparent dielectric film is made of AlN, and has a thickness d (nm) satisfying the following formula, $$0.1x<d<x,$$

wherein x is a film thickness (nm) of said optical recording film, and said transparent dielectric film has a reflectance of not more than 1.90.

4. The optical disk as set forth in claim 1, wherein:

said transparent dielectric film is made of $SiO_2$, and has a thickness d (nm) satisfying the following formula, $$x<d<3x,$$

wherein x is a film thickness (nm) of said optical recording film.

5. The optical disk as set forth in claim 1, wherein:

said transparent dielectric film has a reflectance n which is larger than a reflectance of said transparent substrate and which is around an integer multiple of $\gamma/2d$, wherein d is a thickness (nm) of said transparent dielectric film, and $\gamma$ is a wavelength (nm) of a light beam.

6. The optical disk as set forth in claim 1, wherein:

said transparent dielectric film has a reflectance n which is smaller than a reflectance of said transparent substrate and which is around an odd multiple of $\gamma/4d$, wherein d is a thickness (nm) of said transparent dielectric film, and $\gamma$ is a wavelength (nm) of a light beam.

7. The optical disk as set forth in claim 6, wherein:

said transparent dielectric film is made of $SiO_2$.

8. The optical disk as set forth in claim 6, wherein:

said transparent dielectric film is made of $MgF_2$.

9. The optical disk as set forth in claim 1, further comprising:

an anti-reflection coating of at least a single layer structure having a different reflectance from that of said transparent dielectric film, said anti-reflection coating being formed adjacent to a light incident face of said transparent dielectric film, wherein a layer of said anti-reflection coating, formed in the most proximity to a light incident side, has a reflectance $n_1$ which is smaller than that of said transparent substrate, and which is around an odd multiple of $\gamma/4d_1$, wherein $d_1$ is a thickness (nm) of said anti-reflection coating, and $\gamma$ is a wavelength (nm) of a light beam.

10. The optical disk as set forth in claim 6, wherein:

said anti-reflection coating is made of $SiO_2$.

11. The optical disk as set forth in claim 6, wherein:

said anti-reflection coating is made of $MgF_2$.

12. The optical disk as set forth in claim 9, wherein:

said anti-reflection coating has a reflectance $n_1$ which is around a square root of a product of a reflectance of said transparent substrate and a reflectance of air.

13. The optical disk as set forth in claim 1, further comprising:

a protective film formed on a surface of said optical recording film.

14. The optical disk as set forth in claim 1, further comprising:

a protective film formed on a light incident side.

15. The optical disk as set forth in claim 1, wherein:

said transparent dielectric film is made of a compound selected from the group consisting of AlN, SiN, SlSiN, AlTaN, TaO, SiO, $SiO_2$, $TiO_2$, ZnS, $Al_2O_3$, SiAlOH, and $MgF_2$.

16. The optical disk as set forth in claim 1, wherein:

a total stress of said optical recording film obtained by a product of its internal stress and its film thickness is balanced with a total stress of said transparent dielectric film obtained by a product of its internal stress and its film thickness.

17. The optical disk as set forth in claim 1, wherein:

said transparent dielectric film has a reflectance which is substantially equivalent to a reflectance of said transparent substrate.

18. The optical disk as set forth in claim 14, wherein:

said transparent dielectric film has a reflectance which is substantially equivalent to respective reflectances of said transparent substrate and said protective film formed on the light incident side.

19. The optical disk as set forth in claim 1, wherein:

a difference between a reflectance of said transparent dielectric film and a reflectance of said transparent substrate is not more than 0.3.

20. The optical disk as set forth in claim 1, wherein:

said optical recording film includes a transparent dielectric layer; and said transparent dielectric layer is composed of a material that is the same as the material for said transparent dielectric film and has a different reflectance from that of said transparent dielectric film.

21. The optical disk as set forth in claim 20, wherein:

said transparent dielectric layer has a larger reflectance than that of said transparent dielectric film.

22. An optical disk as claimed in claim 1 wherein:

said transparent dielectric film is formed on the substrate in a region corresponding to said optical recording film.

* * * * *